US012749263B2

(12) United States Patent
Fang et al.

(10) Patent No.: US 12,749,263 B2
(45) Date of Patent: Sep. 29, 2026

(54) METHOD AND SYSTEM OF MULTI-VIEW IMAGE PROCESSING WITH ACCURATE SKELETON RECONSTRUCTION

(71) Applicant: Intel Corporation, Santa Clara, CA (US)

(72) Inventors: Longwei Fang, Beijing (CN); Yikai Fang, Beijing (CN); Hongzhi Tao, Beijing (CN); Qiang Li, Beijing (CN); Hang Zheng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 18/563,719

(22) PCT Filed: Nov. 17, 2021

(86) PCT No.: PCT/CN2021/131079
§ 371 (c)(1),
(2) Date: Nov. 22, 2023

(87) PCT Pub. No.: WO2023/087164
PCT Pub. Date: May 25, 2023

(65) Prior Publication Data
US 2024/0290034 A1 Aug. 29, 2024

(51) Int. Cl.
*G06T 17/00* (2006.01)
*G06T 7/246* (2017.01)
(Continued)

(52) U.S. Cl.
CPC .............. *G06T 17/00* (2013.01); *G06T 7/251* (2017.01); *G06T 7/292* (2017.01); *G06T 7/75* (2017.01); *G06T 19/20* (2013.01); *G06T 2207/30196* (2013.01); *G06T 2207/30221* (2013.01); *G06T 2219/2004* (2013.01)

(58) Field of Classification Search
None
See application file for complete search history.

(56) References Cited

U.S. PATENT DOCUMENTS

2011/0292036 A1* 12/2011 Sali ......................... G06T 17/00 345/419
2011/0306422 A1* 12/2011 Nishimoto ............ A63F 13/213 345/473

(Continued)

FOREIGN PATENT DOCUMENTS

| | | |
|---|---|---|
| CN | 110020611 | 7/2019 |
| CN | 113362452 | 9/2021 |
| EP | 2541409 | 1/2013 |

OTHER PUBLICATIONS

International Searching Authority, "International Preliminary Report on Patentability," issued in connection with International Application No. PCT/CN2021/131079, mailed on May 30, 2024, 6 pages.

(Continued)

*Primary Examiner* — Daniel F Hajnik
*Assistant Examiner* — Jed-Justin Imperial
(74) *Attorney, Agent, or Firm* — Hanley, Flight & Zimmerman, LLC

(57) ABSTRACT

A method and system of multi-view image processing with accurate skeleton reconstruction uses joint confidence values.

17 Claims, 19 Drawing Sheets

(51) Int. Cl.

| | |
|---|---|
| ***G06T 7/292*** | (2017.01) |
| ***G06T 7/73*** | (2017.01) |
| ***G06T 19/20*** | (2011.01) |

(56) References Cited

U.S. PATENT DOCUMENTS

| | | | | |
|---|---|---|---|---|
| 2019/0251341 | A1* | 8/2019 | Nie | G06V 20/46 |
| 2020/0394384 | A1* | 12/2020 | Singh | G06V 40/10 |

OTHER PUBLICATIONS

International Search Report and Written Opinion for PCT Application No. PCT/CN2021/131079, dated May 27, 2022.

Andriluka, et al., "2D Human Pose Estimation: New Benchmark and State of the Art Analysis", human-pose.mpi-inf.mpg.de.

Bridgeman, et al., "Multi-person 3D Pose Estimation and Tracking in Sports", surrey.ac.uk, 10 pgs.

Bulat, et al., "Human Pose Estimation via Convolutional Part Heatmap Regression", arXIV:1609.0174v1 [cs.CV] Sep. 6, 2016, 16 pgs.

Chen, et al., "Multi-person 3D Pose Estimation in Crowded Scenes Based on Multi-View Geometry", arXiv:2007.10986v1 [cs.CV] Jul. 21, 2020, 17 pgs.

Hartley, et al., "Triangulation", Computer Vision and Image Understanding, vol. 68, No. 2, November, pp. 146-157, 1997. Article IV970547, p. 12.

Lourakis, et al., "SBA: A Software Package for Generic Sparse Bundle Adjustment", Foundation for Research and Technology—Hellas, ACM Transactions on Mathematical Software, vol. 36, No. 1, Article 2, Publication date: Mar. 2009, 30 pgs.

Shen, et al., "Multi-View Matching (MVM): Facilitating Multi-Person 3D Pose Estimation Learning with Action-Frozen People Video", arXiv:2004;05275v1 [cs.CV] Apr. 11, 2020.

Sun, et al., "Deep High-Resolution Representation Learning for Human Pose Estimation", arXiv:1902.09212v1 [cs.CV] Feb. 25, 2019.

Wang, J., et al., "Deep High-Resolution Representation Learning for Visual Recognition", IEEE Transactions on Pattern Analysis and Machine Intelligence (2020).

Yang, et al., "Articulated Human Detection with Flexible Mixtures-of-Parts", The Department of Computer Science, University of California Irvine, Irvine, CA 92697, 15 pgs.

Yang, C., et al., "Mean-shift analysis using quasinewton method", s[C]//Proceedings, International Conference on Image Processing (Cat. N. 03CH37429), IEEE, 2:II-447 (2003).

* cited by examiner

600

1204

METHOD AND SYSTEM OF MULTI-VIEW IMAGE PROCESSING WITH ACCURATE SKELETON RECONSTRUCTION

CLAIM OF PRIORITY

This Application is a National Stage Entry of, and claims priority to, PCT Application No. PCT/CN2021/131079, filed on Nov. 17, 2021 and titled "METHOD AND SYSTEM OF MULTI-VIEW IMAGE PROCESSING WITH ACCURATE SKELETON RECONSTRUCTION," which is incorporated by reference in its entirety for all purposes.

BACKGROUND

With the advancement of multi-camera, three-dimensional, immersive visual displays based on volumetric models, especially of athletic events, it is possible to rotate the scene to a desired perspective of a virtual camera view in any angle, and zoom in or out to create a desired proximity to the action, including showing relatively exact poses of the athlete as the athlete performs an athletic motion such as twisting and diving to catch or throw a ball for example. Some of these applications are for commercial use by announcers or pundits at a television sports broadcasting company, video recording company, athletic league company, or the athletic team itself for analysis of the motion and athletic positions for coaching purposes or even for medical reasons such as injury prevention. In other applications, the viewer of the images, such as fans that watch or record the athletic events, have the ability to control the views and automatically create many different virtual views.

In these situations, the athlete or object detection and tracking can be accomplished by using a camera array spread around an athletic field with all of the cameras pointing toward the field. The athletes often can be individually identified, and the position, motion, and pose of the athletes can be tracked by using estimated positions of the athlete's joints, commonly referred to as a skeleton, over time. The skeleton reconstruction, however, can be very difficult because the object, being people, change their shape as they move by moving their limbs or other body parts. This proves even more difficult when athletes wear the same uniform and have a similar appearance. In this case, it is difficult to automatically distinguish the athletes when their images overlap in a single view. Also, when occlusions and deformations are in the image data, and in turn in the skeleton data, conventional algorithms can result in low quality images or bad user experience when certain virtual views cannot be generated.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
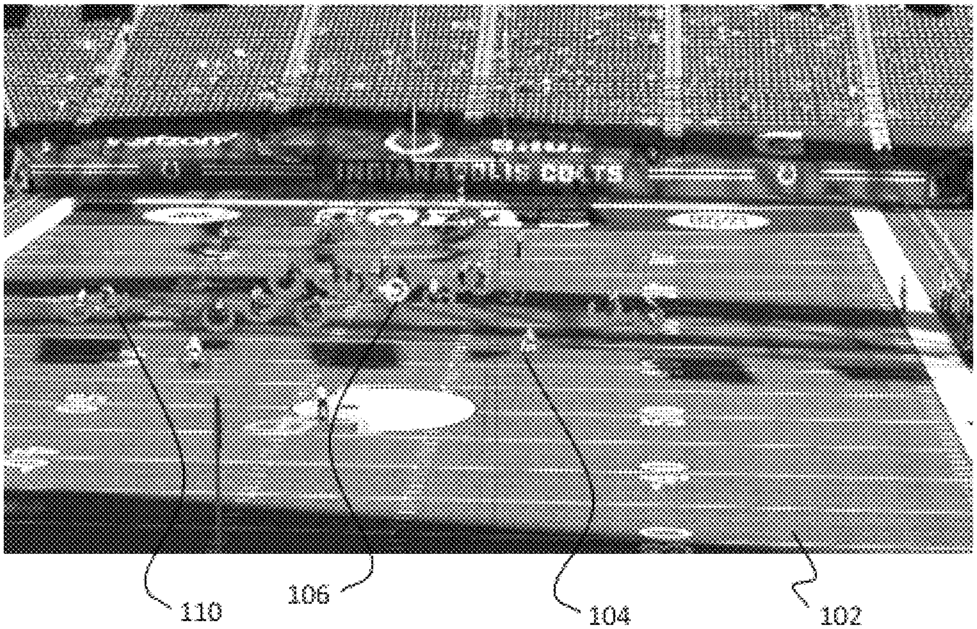
FIG. 1 is an image showing example object recognition for skeleton reconstruction and tracking according to at least one of the implementations disclosed herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures that may be, or include, processor circuitry such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, professional electronic devices such as one or more commercial television cameras, video cameras, or camera arrays that are disposed to record motion of an event or otherwise one or more people, animals, or other objects in motion and captured by the cameras, and/or consumer electronic (CE) devices such as imaging devices, digital cameras, smart phones, webcams, video cameras, video game panels or consoles, televisions, set top boxes, and so forth, may implement the techniques and/or arrangements described herein, and whether a single camera or multi-camera system. Otherwise, devices that are associated with such cameras or received the image data from such cameras may be any computing device including computer networks, servers, desktops, laptops, tablets, smartphones, mobile devices, and so forth. Further, while the following description may set forth numerous specific details such as logic implementations, types and interrelationships of system components, logic partitioning and/or integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on at least one machine-readable or computer-readable medium or memory, which may be read and executed by one or more processors formed by processor circuitry. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer or machine readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of multi-view image processing with accurate skeleton reconstruction are described herein.

Conventional 3D volumetric video is often generated to capture every moment in a sports game and with multiple high-resolution cameras installed around the field, court, or other venue of an athletic event. This can permit an interactive and immersive experience to fans, broadcasters, athletic teams, and so forth. Specifically, 3D video applications now allow users to navigate the game replay from any angle when moving a virtual camera and can immerse themselves in the game by viewing the game from one of the player's perspectives.

The 3D applications used to process the image data to provide these views often construct and track a skeleton of each player in order to be able to position the joints of a player from any view point. In addition to such player identification, tracking, and viewing, an accurate player 3D skeleton feature can be used for other roles such as position analysis for entertainment or the athletic team itself to coach better player motion by analyzing the exact 3D positioning of limbs or other joints of an athlete. For instance, a player's 3D skeleton can be used to detect body and/or head position or orientation in a game, which allows for the creation of a virtual camera position in any angle relative to the player.

Furthermore, 3D skeleton tracking also can be used for injury analysis, and specifically skeletal mechanical analysis. Particularly, the positioning of joints, and in turn bones, of a specific player can be analyzed to estimate the stress and strain on a joint and bone of the athlete. Such a system can then determine the reason for a past injury or suggest adjustments to change from captured dangerous motion of an athlete to a safer motion in the future to avoid injury.

The 3D skeleton tracking also can augment human 3D reconstruction when deformation or occlusions are present with the external views of an athlete on a playing field for example.

For 3D skeleton reconstruction, one conventional system uses triangulation to generate 3D points from two or more camera views. Some of these known systems use epipolar constraints to reconstruct a 3D point in a 3D space. Another widely used reconstruction method is bundle adjustment. The underlying idea of these two systems is to use projection of points of the reconstructed 3D point onto a 2D virtual view in order to minimize residual errors and factor all 2D points from all camera views. These previous reconstruction methods, however, do not consider the internal connections between points, such as a reasonable bone length, while reconstructing 3D pose points one by one, thereby often resulting in erroneous depictions of an athlete.

For conventional skeleton reconstruction, some known systems generate 3D poses by using a bone length to refine a player pose after all skeleton points are constructed. Thus, these known systems can compute a reasonable bone length, but have difficulty achieving correct 3D poses because the fitting process does not consider projection errors in 2D space.

Other known systems generate the 3D pose by considering a projection error and prior bone length simultaneously in a gaussian mixture model. These systems also can achieve a reasonable result but are too time consuming due to a large computational load. Thus, this known system cannot be operated in real time when many cameras are being used and when the 3D points need to be iteratively reprojected in each camera view. Furthermore, the accuracy of the reconstruction in this known system is not compatible with bundle adjustment.

To resolve the issues mentioned above, the disclosed 3D skeleton reconstruction system and method factors human gesture constraints, by using joint to joint measurement or bone length as a constraint. Specifically, statistical or summary data of a pre-formed joint to joint distance (or bone length) dataset is obtained that provides average joint or key point distances of a human skeleton, such as from head to neck, neck to shoulder, and so forth. The standard deviation of the distances also may be provided in the dataset data to provide an acceptable range of joint to joint distances. During a runtime, 2D images from multiple cameras are used to first generate 2D bounding boxes of 2D poses. Pose confidence values are then used to remove outliers and generate clusters of candidate 3D points for each or individual joint. The clusters points are validated, and each cluster is reduced to a single accurate 3D joint point by using joint confidence values that satisfy criteria based on the data of the dataset.

Particularly, the dataset parameters or data may be used in a number of operations to better ensure a resulting more accurate skeleton. This may include using joint confidence values that depend on whether a distance from a current candidate 3D point on one joint cluster is within an acceptable distance, based on the dataset, to multiple points on another joint cluster. A total confidence value of the candidate 3D point is then compared to a threshold to determine whether or not the current candidate 3D point should remain in the cluster. By one example approach, the total confidence value is a proportion of points on one joint cluster that has an acceptable distance to the candidate 3D point on another joint cluster. The remaining candidate 3D points on a cluster are then used to generate a single joint point of the joint cluster. Once a cluster is reduced to a single joint point, the single joint point locations (or just joint) then may be further refined by using criterion based on the dataset again. When a joint is found to be in error (out of position), the location of the joint may be adjusted by using joint to joint distances obtained from the dataset, such as by using the mean distances.

Since joint distances are being used in multiple operations with much of the process being performed in 3D space, this significantly reduces time consumption by eliminating iterative operations in conventional methods that project 3D points from 2D images from each camera view and optimize the reconstruction of the skeletons by performing the iterations. Also, this arrangement of the present system and method is very robust to errors including false bounding box matches (or false association between detected 2D poses) from the 2D images and incorrect 2D pose detections, as well as projection matrix errors so that both the 2D pose operations and projections to 3D will not adversely affect the skeleton reconstruction and the skeleton accuracy will increase.

Referring to FIG. 1, an image 100 shows an example environment of the present skeleton reconstruction and tracking system, and shows an athletic field 102 with two teams playing in an athletic event, here being American football, where each player has been segmented and recognized by an arc 104 or 110 of different teams. A ball 106 is identified in a circle.

Figure 2:
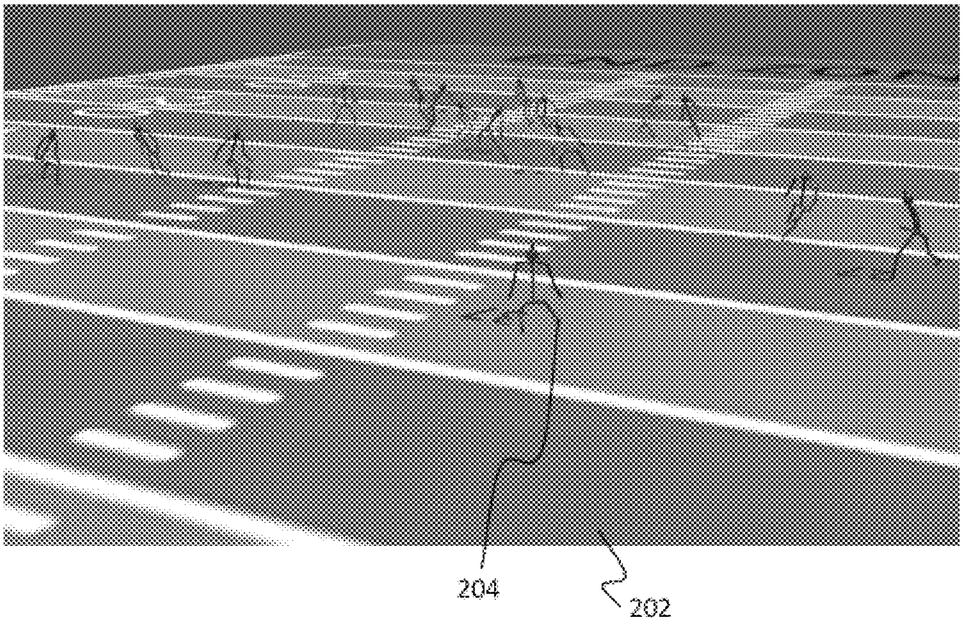
FIG. 2 is an image showing example reconstructed skeletons according to at least one of the implementations disclosed herein.

Referring to FIG. 2, an image 200 shows the results of the skeleton reconstruction and tracking method and system where each player on the athletic field 202 is represented by a skeleton 204. It will be understood that in addition to the implementations disclosed herein, a player's team and jersey number, as shown, also may be tracked separately to identify players. Such additional tracking is not described herein.

Figure 3:
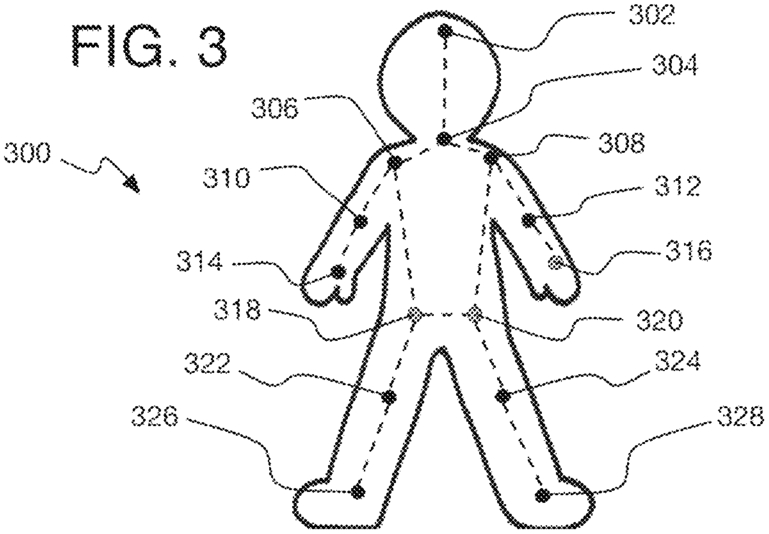
FIG. 3 is a schematic diagram showing an example skeleton according to at least one of the implementations disclosed herein.

Referring to FIG. 3, an example skeleton 300 to be constructed may be generated by recognizing a 3D key point for each joint being detected and reconstructed. By one form, the 3D point forming a joint may be referred as a joint point or joint or key point. The skeleton 300 may have a number of key points and different arrangements mainly representing human bone joints. In this example, skeleton 300 has fourteen key points including key points of a head 302, neck 304, left and right shoulders 306 and 308, left and right elbows 310 and 312, left and right wrists 314 and 316, left and right hips 318 and 320, left and right knees 322 and 324, and left and right ankles 326 and 328. By one form, the head joint 302 is considered to be at the top of the head but could be at other locations It will be understood that joint to joint distance and bone length is not necessarily limited to actual physical measurement of a bone itself and may refer to a point that represents an estimated center of a joint on a skeleton, which can be estimated by the use of imaging or other methods. Distances from the dataset may be referred to as actual distances versus distances captured in a camera array for skeleton reconstruction herein merely for differentiating purposes.

Figure 4:
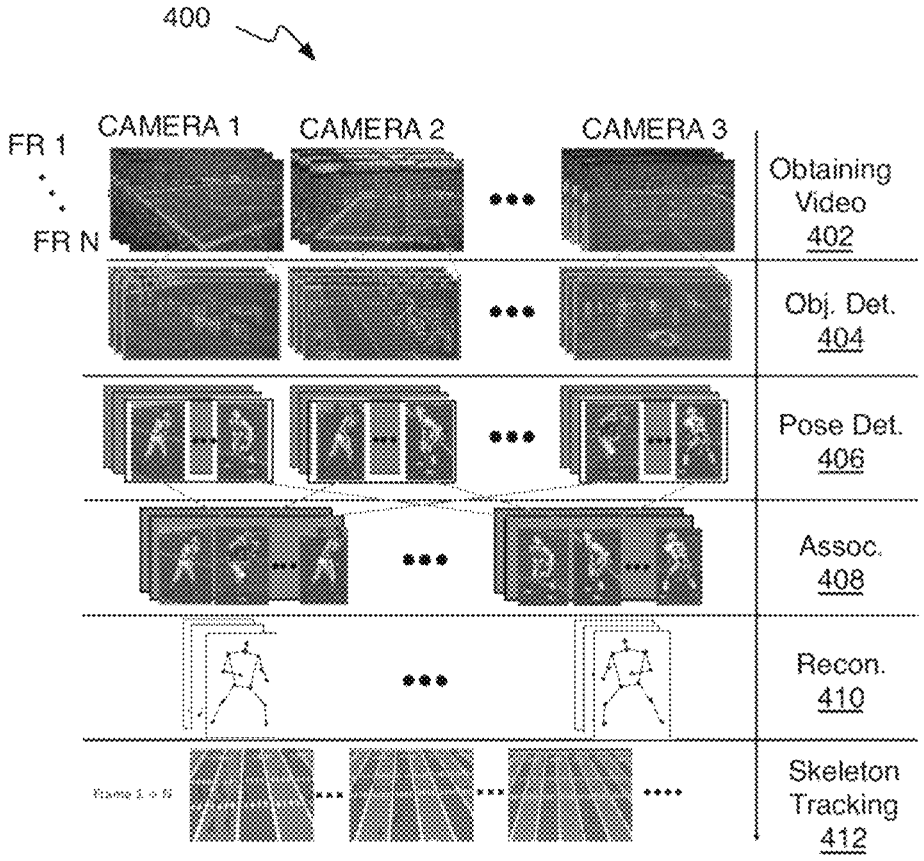
FIG. 4 is a schematic flow diagram of multi-view image processing with accurate skeleton reconstruction according to at least one of the implementations herein.

Referring to FIG. 4, an example diagram 400 shows the basic operations of skeleton reconstruction and tracking. This includes first obtaining 402 the video sequences of frames (or images or pictures) from multiple cameras (here cameras 1-3 for this example), and here capturing athletes in an athletic event at a stadium. Then object detection 404 is performed to detect the separate athletes. Pose detection 406 is then performed that generates points for an athlete for each camera, which can include a rough 2D skeleton in 2D bounding boxes. Association 408 is then performed to match the athlete from different video sequences. The result is correspondences between poses of different camera views. Next 3D skeleton reconstruction (or just reconstruction) 410 is performed here by using joint confidence values compared to data of a pre-formed joint to joint distance dataset to provide a single joint point for each individual joint being tracked. Thereafter, skeleton tracking 412 or other applications can use the reconstructed skeleton.

Figure 5:
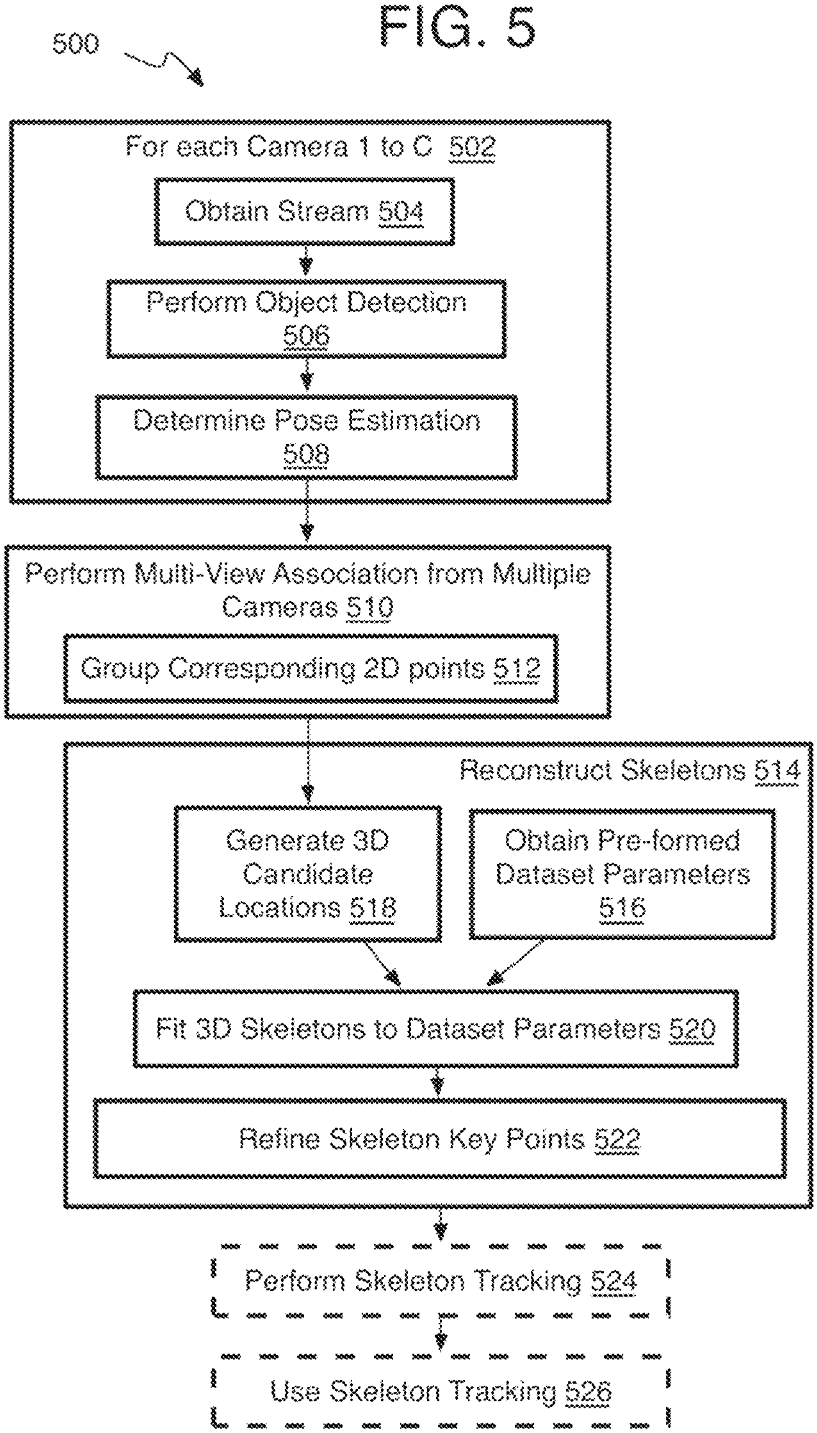
FIG. 5 is a flow chart of a method of multi-view image processing with accurate skeleton reconstruction according to at least one of the implementations herein.

Referring to FIG. 5, an example process 500 for multi-view image processing with accurate skeleton reconstruction is shown in more detail. In the illustrated implementation, process 500 may include one or more operations, functions, or actions as illustrated by one or more of operations 502 to 526 numbered evenly. By way of non-limiting example, process 500 may be described herein with reference to example image processing systems 700 and 1400 of FIGS. 7 and 14 respectively, and where relevant.

Process 500 may include "for each camera 1 to C" 502, a video stream is obtained 504 and of the same scene with each camera showing one or more beings such as people (or animals or other objects) from a different perspective. This may include capturing video sequences from a camera array around a stadium, arena, rink, field, stage, or other area that provides a sport or other event that can be amid at least two cameras of the camera array. The sport may be team sports such as baseball, American football, soccer, basketball, rugby, cricket, lacrosse, hockey, or any other sport with two or more players on a play field. Alternatively, individual sports with multiple athletes in a same scene to track may include racing such as swimming, horse racing, dog racing, and so forth. Some individual sports also may be recorded and benefit from the skeleton reconstruction method disclosed herein, such as figure skating or other Olympic type sports, racquet sports such as tennis, or golf, where analysis of motion is very important. Also, the event for skeleton reconstruction and tracking is not limited to sports. Any activity with actions of one or more objects or beings that can be represented as a moving articulated skeleton may be analyzed and tracked. Alternatively, the video sequences could be captured by a single camera instead of a camera array, or few moving cameras in a small camera array, that capture a fixed scene or very slow moving scene.

Also, the cameras may be commercial-grade high-definition cameras, whether wired or wireless with wi-fi capability, such as TruVision® Wedge (TVW) cameras Canon® electro-optical system (EOS) cameras, and by one example, is at least about 18 cameras. The captured images may be in a color scheme (YUV, RGB, and so forth), grey-scale, or black and white, or may be from one or more cameras in the camera array that capture non-vision range images such as infrared (IR), and so forth.

Obtaining the video streams also may include pre-processing the image data at least sufficiently for the operations disclosed herein including the skeleton reconstruction. Thus, raw image data may be obtained from cameras or camera memory, and pre-processing may include demosaicing, color correction, de-noising, and so forth. Otherwise, pre-processed video sequence image data may be obtained from memory and decoded when transmission to the skeleton tracking system is desired.

Process 500 then may perform object recognition or detection 506 performed separately on each video sequence streamed from the cameras, and which may or may not include semantic recognition. The object recognition techniques may use neural network or machine learning techniques that identify the objects such as people (or here athletes), a ball or puck for example, and other objects as desired. Such neural networks may be trained for a specific sport or event. Such object recognition may result in 2D bounding boxes or object segmentation boundary around each recognized object or person (or player or athlete), and on each or individual frame of a video sequence of each camera of a camera array being used. This establishes the 2D point positions in a frame (or 2D image space) for each or individual object or person being tracked.

Thereafter, process 500 may include pose estimation 508 that may attach or associate a respective identifier of a pose to a recognized object. Separate processes using jersey number, and/or team identification could also be used here to identify poses. The pose estimation may include the processing of image patches cropped from person detection results, such as 2D bounding boxes, and from the separate video sequences (or separate views). The resulting pose data may be 2D pose data that first establishes 2D key points for each detected person in each camera view that can be considered to be rough estimates of joints. Techniques used to generate the poses and key points may include Hour-Glass algorithms and/or Cascaded Pyramid Networks. Some techniques generate 2D pose confidence values that each indicate a probability that a 2D point is a joint, and this is explained in greater detail below with process 900.

Process 500 may include "perform multi-view association from multiple cameras" 510. Once the 2D pose data is obtained, multi-camera view analysis will match features or recognized objects in frames from the same or similar time point and from the different views or video sequences. The objects or estimated 2D points may be matched by triangulation and/or other techniques. In other words, this may involve finding correspondences between detected 2D bounding boxes from the individual camera views and belonging to the same person (or player).

Process 500 may include "group corresponding 2D points" 512. Unlike other association algorithms that generate 3D reconstructions in this stage, here the association merely matches 2D pose points from frames of different video sequences of different perspectives. The result here is that each pose point of each 2D skeleton or pose is assigned to a certain joint. This may be represented by a list of correspondences between 2D pose points and for a particular joint.

Process 500 may include "reconstruct skeletons" 514, and where a reconstruction algorithm determines the 3D skeleton key point locations for the individual objects recognized as a person (or player or athlete). As a preliminary task included here, process 500 may include "obtain pre-formed dataset parameters" 516, where joint to joint human measurements are collected and then summarized as parameters (or parameter data, statistics, or just data). By one form, thousands of people may be measured in images to form a dataset. The data may be the average joint to joint distance (or bone length) between each joint connection being tracked (head to neck, neck to shoulder, shoulder to elbow, shoulder to hip, and so forth). The dataset data also may include the standard deviation of the individual distances, for example. Other details of the dataset are provided below with process 800.

Process 500 also may include "generate 3D candidate locations" 518. This may include a number of operations. By one form, this involves obtaining the pose confidence values of two 2D pose points that could potentially form a bone length or distance between two different joints being reconstructed. The pose confidence values are compared to a pose criterion. Outlier points that do not satisfy the criterion are dropped. The remaining 2D points are used in a 3D generation algorithm such as triangulation to generate candidate 3D points. Alternatively, the conversion or projection from 2D to 3D could include generating depth maps and a 3D model or reconstruction of the scene that was captured. Then, the system may map any key points from the 2D poses to 3D coordinate locations on the reconstruction. The result is initial clusters of candidate 3D points at each joint being reconstructed.

Process 500 may include "fit 3D skeletons to dataset parameters" 520, where the candidate 3D points are kept or dropped depending on whether or not the distances of the candidate 3D points from one cluster to another cluster is within the acceptable ranges provided by the data from the pre-formed dataset. By one approach, a candidate 3D point on a cluster is kept when a proportion of the distances from the candidate 3D point to multiple points at another cluster are within the data range. A single joint point is then determined at each cluster using the remaining candidate 3D points at the cluster.

Process 500 may include "refine skeleton key points" 522. This operation includes determining which of the single joint points are still out of position and have distances out of the data range. The distance to a joint location that are found to be out of the data range are replaced with a distance from the data, such as an average distance. This results in output 3D key points of the skeletons. At this operation then, 3D skeletons are established, but only at individual time points (or frame points). The skeletons are not linked temporally yet. More details of the skeleton reconstruction are provided in process 900 below.

Optionally, once the skeletons are generated, process 500 may include "perform skeleton tracking" 524. Here, multi-player 3D skeleton tracking solutions link corresponding skeletons temporally from time point to time point (or frame to frame along the video sequences), and focuses on matching measured 3D skeletons with person (or player) IDs to predicted skeletons. The skeleton tracking methods often use Euclidean distances directly, Kalman filters, and other techniques and the skeleton reconstruction herein is not particularly limited to a tracking algorithm.

Once, or as, the skeleton tracking is performed, process 500 may include "use skeleton tracking" 526. Here, 3D virtual views can be generated that rotates the action in the captured scene and/or provides point-of-view (POV) of one of the players on an athletic field for example. Such techniques that can use the skeleton tracking to generate virtual views include Structure from Motion (SFM) and Simultaneous Localization and Mapping (SLAM) algorithms. Otherwise, the skeletons, with or without skeleton tracking, can be used for image quality refinement, image coding efficiency, person (or athlete) display and/or motion analysis. Motion analysis may be used for training, rating the skill of the motion, and medical injury analysis to offer suggestions for safer motions or to analyze how an injury already occurred. Motion analysis could also be used for surveillance, event detection, and/or automatic driving. Otherwise, the skeletons, with or without the tracking, can be used for other applications.

Figure 6:
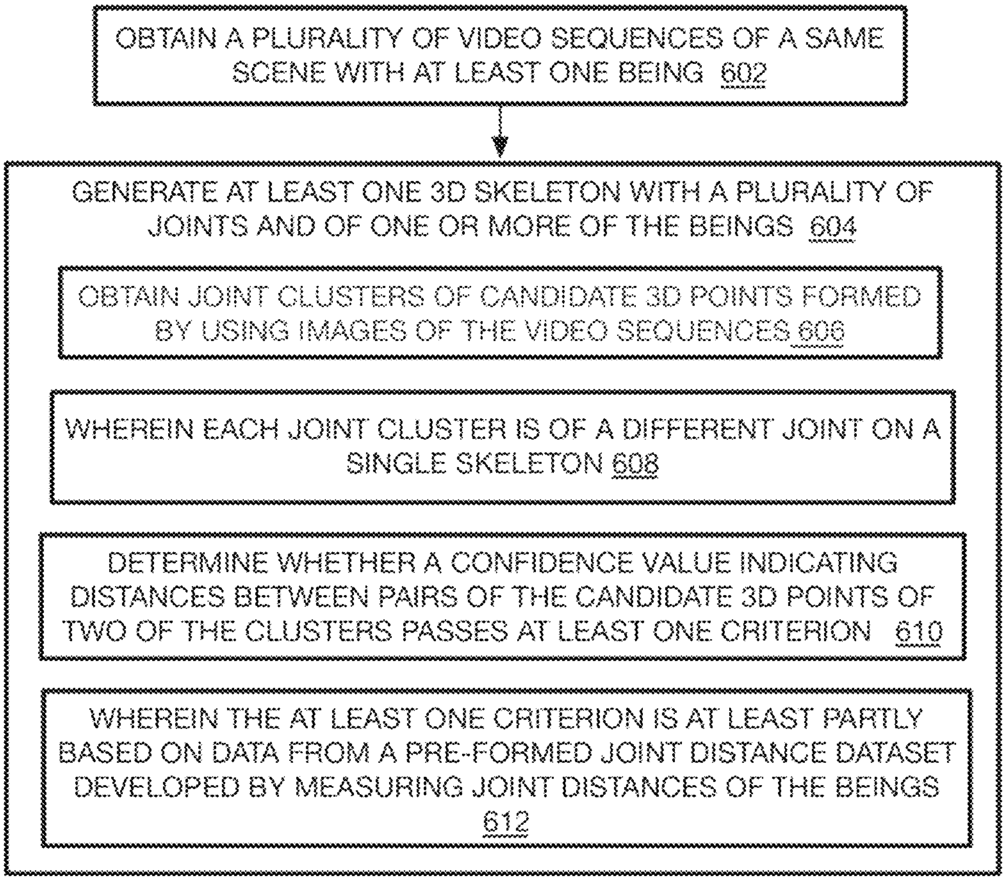
FIG. 6 is another flow chart of a method of multi-view image processing with accurate skeleton reconstruction according to at least one of the implementations herein.

Referring to FIG. 6, an example process 600 for multi-view image processing with accurate skeleton reconstruction is shown. In the illustrated implementation, process 600 may include one or more operations, functions, or actions as illustrated by one or more of operations 602 to 612 numbered evenly. By way of non-limiting example, process 600 may be described herein with reference to example image processing systems 700 and 1400 of FIGS. 7 and 14 respectively, and where relevant.

Process 600 includes "obtain a plurality of video sequences of a same scene with at least one being" 602, and as already mentioned above with processes 400 and 500.

Process 600 may include "generate at least one 3D skeleton with a plurality of joints and of one or more of the beings" 604. This operation may include "obtain joint clusters of candidate 3D points formed by using images of the video sequences" 606, and "wherein each joint cluster is of a different joint on a single skeleton" 608.

This operation assumes earlier 2D operations have already been performed as described above. Thus, may include the object detection, 2D box and 2D pose estimation, and the 2D association to generate initial clusters of candidate 3D points at each joint as described above. Different ways to perform these operations may be used here alternatively to that described above.

Then this operation includes validating the candidate 3D points which may be referred to as skeleton fitting. By this approach, process 600 may include "determine whether a joint confidence value indicating distances between pairs of the candidate 3D points of two of the clusters passes at least one criterion" 610. For this operation, the system determines the 3D distance from a current candidate 3D point in a current cluster to multiple or all points in another cluster. Each time a distance passes at least one criterion, a joint confidence value may be incremented for the current candidate 3D point.

Process 600 may include "wherein the at least one criterion is at least partly based on data from a pre-formed joint distance dataset developed by measuring joint distances of the beings" 612. By one example, the joint confidence value is incremented each time a distance to a point in another cluster is at or within an acceptable range of distances from the data of the dataset as the at least one criterion.

A total joint confidence value for the current candidate 3D point is then compared to some minimum (second) criterion that sets the minimum proportion of the distances to the other cluster that should be within the acceptable data range. If the total joint confidence value satisfies the criterion, then the current candidate 3D point is kept, but is otherwise dropped. By one approach, the second criterion is 0.5 so that at least half of the points on another cluster must provide a current candidate 3D point distances that meet the acceptable range criterion. This is repeated for each initial candidate 3D point on each of the joints, which will usually reduce the size of the clusters. When no current candidate 3D point can satisfy the second criterion, then the points with a maximum total joint confidence value may be kept although other alternatives could be used as well (such as top n maximum points). The remaining candidate 3D points in a cluster are then used to generate a single joint point by point combining or interpolating algorithms, such as by mean-shift or other algorithm.

The single joint points also may be refined by first determining which of the single joint points still have distances to other joints that are still outside of the acceptable range of distances from the dataset data. Those joints that still have errors and are in a wrong location can then be modified by using a distance, such as a mean distance, from the data. The output single joint points, including the refined points, of each skeleton can then be provided for skeleton tracking operation to track the skeletons from frame to frame to generate virtual views, and/or perform the other end applications mentioned herein.

Figure 7:
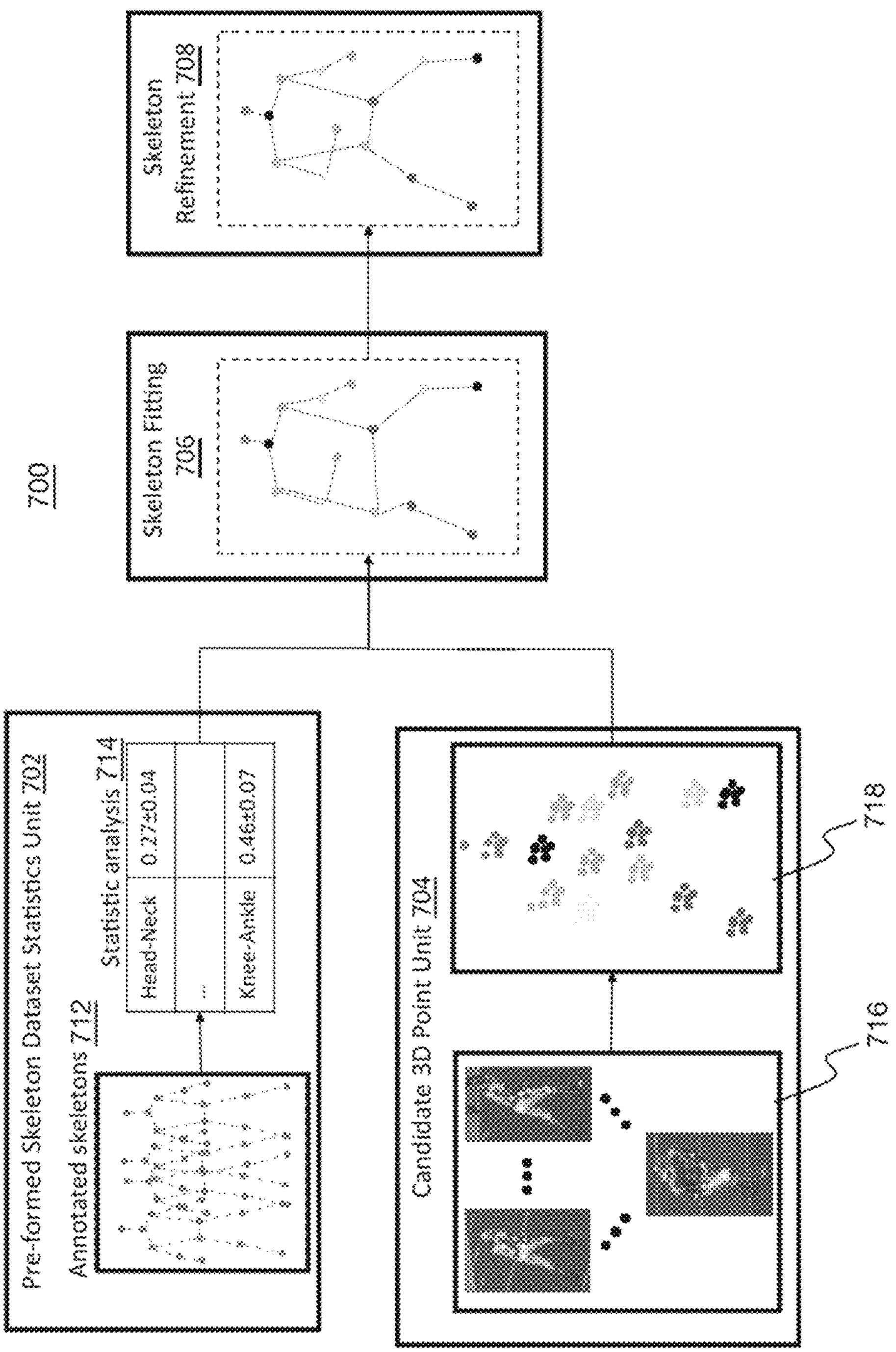
FIG. 7 is a schematic diagram of an image processing system to perform skeleton reconstruction according to at least one of the implementations herein.
Figure 8A:
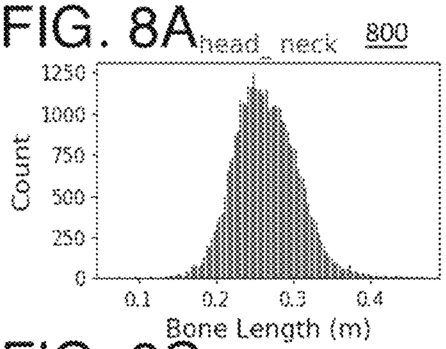
FIGS. 8A-8G are each graphs showing pre-formed skeleton dataset bone length distributions according to at least one of the implementations herein.
Figure 8B:
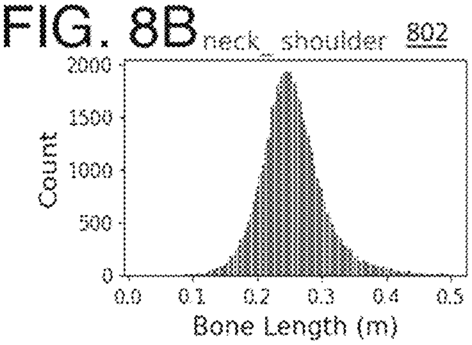
Figure 8C:
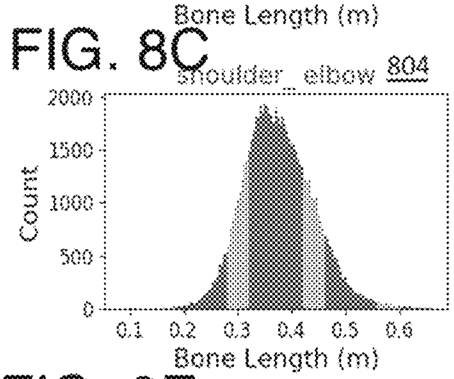
Figure 8D:
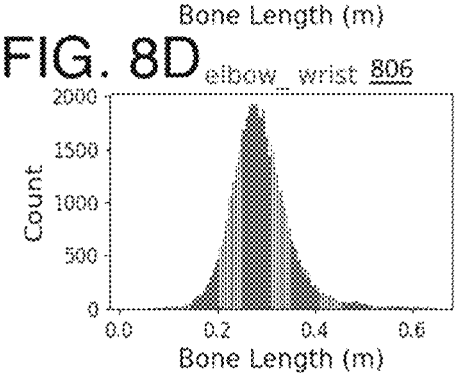
Figure 8E:
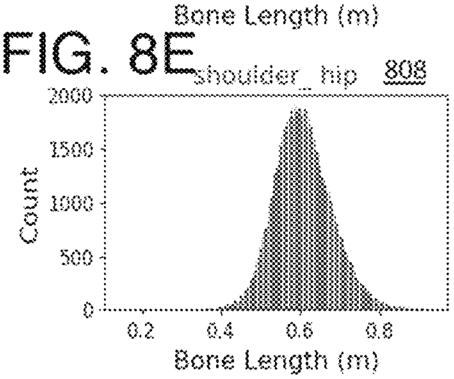
Figure 8F:
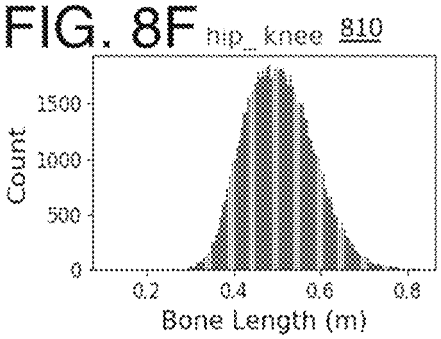
Figure 8G:
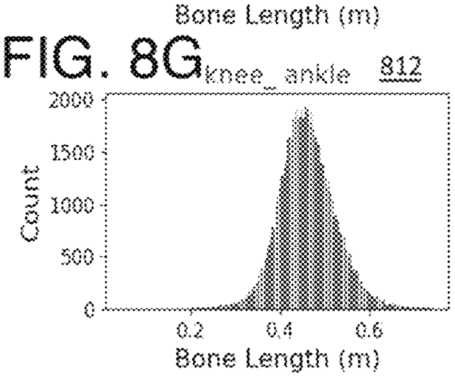

Referring to FIG. 7, an image processing system or device 700 is arranged to perform the skeleton reconstruction methods described herein. The system 700 (or skeleton reconstruction or SC system) has a pre-formed skeleton dataset statistics unit 702 that may be referred to as a dataset unit, dataset parameter unit, bone length dataset unit, and so forth. The system 700 also has a candidate 3D point unit 704, a skeleton fitting unit 706, and a refinement unit 708.

The pre-formed skeleton dataset statistics unit 702 provides statistics or parameters on a large dataset of joint to joint (or bone length) distances that can be used later for skeleton fitting during a runtime of the skeleton reconstruction operations. Thus, the dataset and dataset parameter generation may be a preliminary process that is performed offline. The dataset may be a multi-view annotated dataset of annotated 2D pose key points of many people. By one form, sampling for the dataset is taken of the type of people that are being analyzed and that may have a different size than the general population, such as athletes generally, or even for a specific sport. In an actual dataset used for experimentation for the presently disclosed method, the sampling is from general male team sports, and included 36290 players from three sports games including 5566 players for basketball, 17571 players for football, and 13153 players for soccer, where the typical body size is more likely to be larger than the general population. The annotation of each player involved four camera views, and the bundle adjustment method was used to generate 3D ground truth skeletons from 2D images. By one approach, the parameters or statistics (or data) are the joint to joint distances and mean distances of the ground truth skeletons. The statistics can be obtained as follows.

An athlete X may be represented as;

$$X = \{x_i \mid i = 1, 2, \ldots, m\}, \tag{1}$$

where $x_i$ refers to the length of bone i, and m is the total number of bones (joint to joint length being tracked) of one player. The mean and standard deviation of the bone length i is represented as:

$$\bar{x}_i = \frac{1}{N}\sum_{j}^{N} x_i^j \tag{2}$$

$$\sigma_i = \sqrt{\frac{\sum_j^N (x_i^j - \bar{x}_i)^2}{N-1}} \tag{3}$$

where $\tilde{x}_i$ is the mean bone length of a specific bone length (or joint to joint distance) i for the entire dataset, $$x_i^j$$

is the jth bone i,N is the total number of players in the dataset, and $\sigma_i$ is the standard deviation of each bone length i. In theory, $\tilde{x}\pm3\sigma$ can cover 99.7% of the cases. Thus, the bone length boundary values are chosen as $\tilde{x}-3\sigma$ and $\tilde{x}+3\sigma$. For the annotations used on the dataset, eight types of bones exist (when counting left and right bones as a single category).

Referring to FIGS. 8A-8G, example statistical distributions of each bone type is shown and is graphed by joint to joint distance (in meters) by sample count. Also, Table 1 just below lists these types and their mean as well as the maximum and minimum lengths defining an acceptable range of bone length for the skeleton reconstruction and obtained from the standard deviation.

TABLE 1

Example upper and lower limit of each bone length type for the present dataset.

| Name | Mean (m) | Standard deviation (m) | Lower limit (m) | Upper limit (m) |
|---|---|---|---|---|
| Head_Neck | 0.27 | 0.04 | 0.15 | 0.39 |
| Neck_Shoulder | 0.26 | 0.05 | 0.11 | 0.41 |
| Shoulder_Elbow | 0.38 | 0.07 | 0.17 | 0.59 |
| Elbow_Wrist | 0.29 | 0.07 | 0.08 | 0.5 |
| Shoulder_Hip | 0.61 | 0.07 | 0.40 | 0.82 |
| Lhip_Rhip | 0.25 | 0.05 | 0.10 | 0.50 |
| Hip_Knee | 0.51 | 0.08 | 0.27 | 0.75 |
| Knee_Ankle | 0.46 | 0.07 | 0.25 | 0.67 |

Referring again to FIG. 7, during a runtime, and once 2D pose points 716 and correspondences are obtained by the association operations described above with process 500, the candidate 3D point unit 704 removes outlier 2D points for a skeleton and converts the 2D points to 3D candidate points. This results in a candidate 3D point cluster for each joint in the skeleton 718. The skeleton fitting unit 706 then uses the dataset data or parameters to determine a single joint point among each joint cluster and for each joint of the skeleton being analyzed to generate a reasonably accurate skeleton. Thereafter, the skeleton refinement unit 708 may shift the locations of the joint points when the joint points are still in erroneous positions according to the dataset. The dataset data may be used both to determine which joint points are still out of place and then to correct the joint locations. The refinement operation may be referred to as a post processing operation. More detail of these operations are provided below with process 900.

Figure 9A:
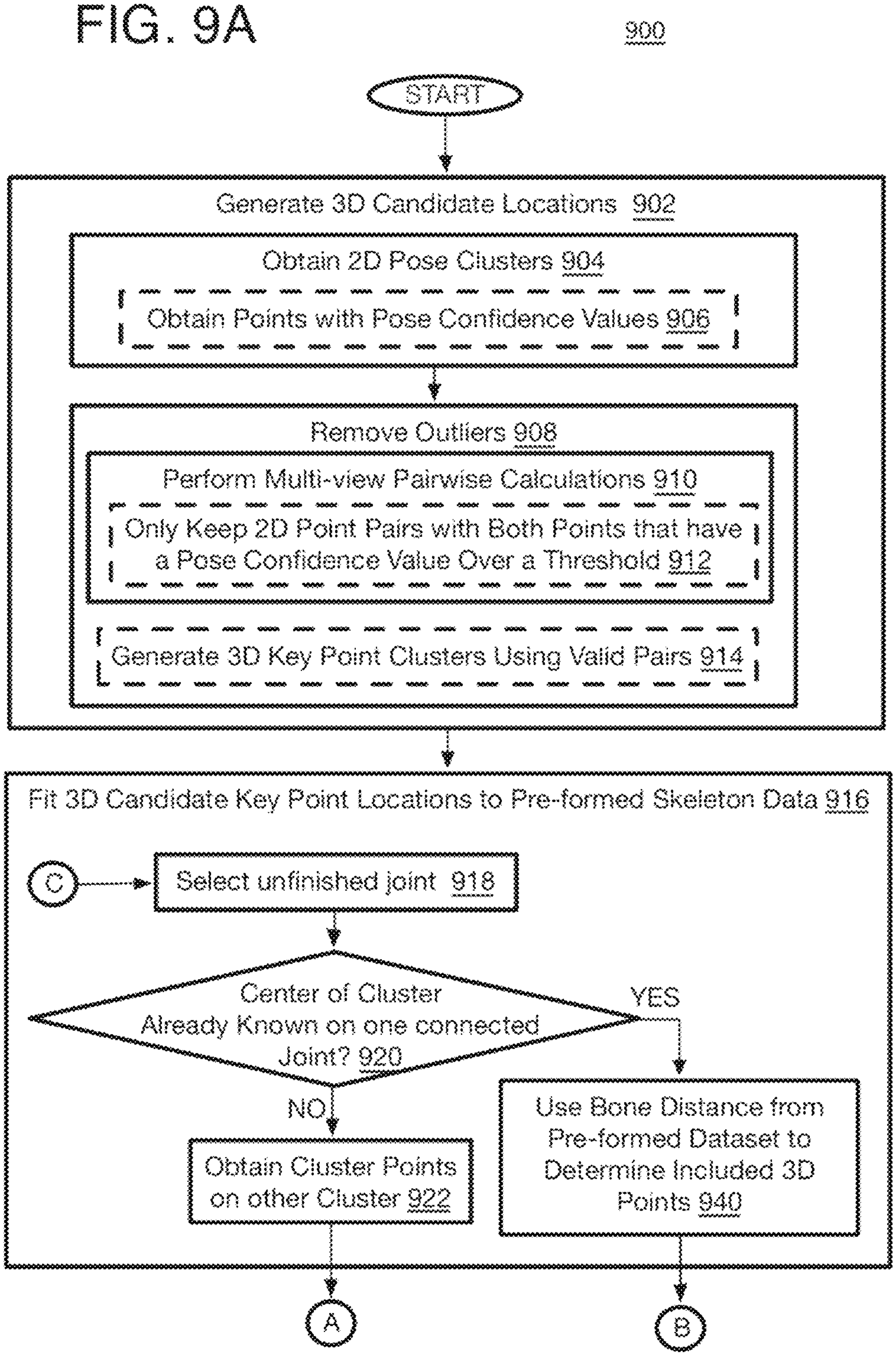
FIGS. 9A-9C is a detailed flow chart of a method of multi-view image processing with accurate skeleton reconstruction according to at least one of the implementations herein.
Figure 9B:
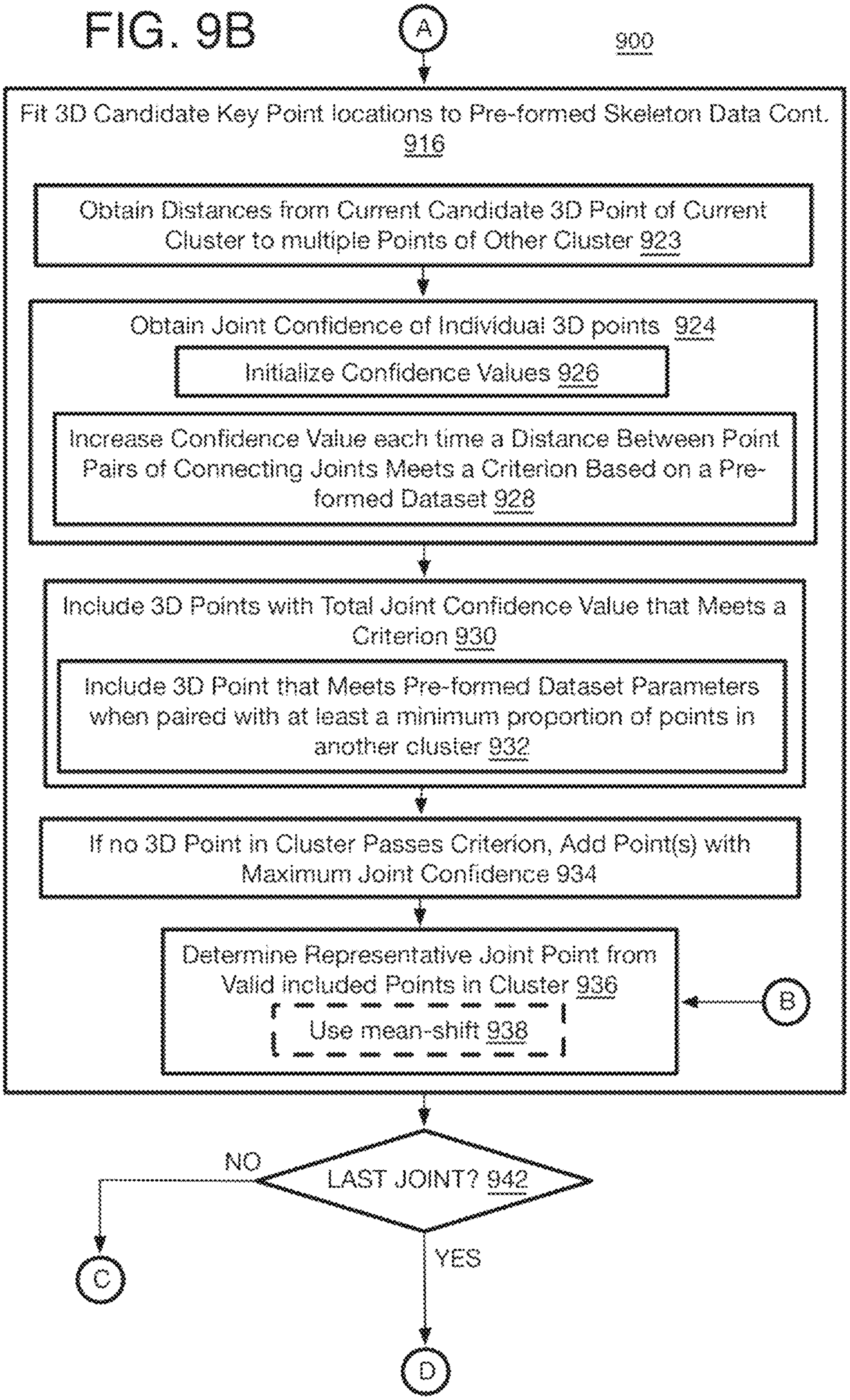
Figure 9C:
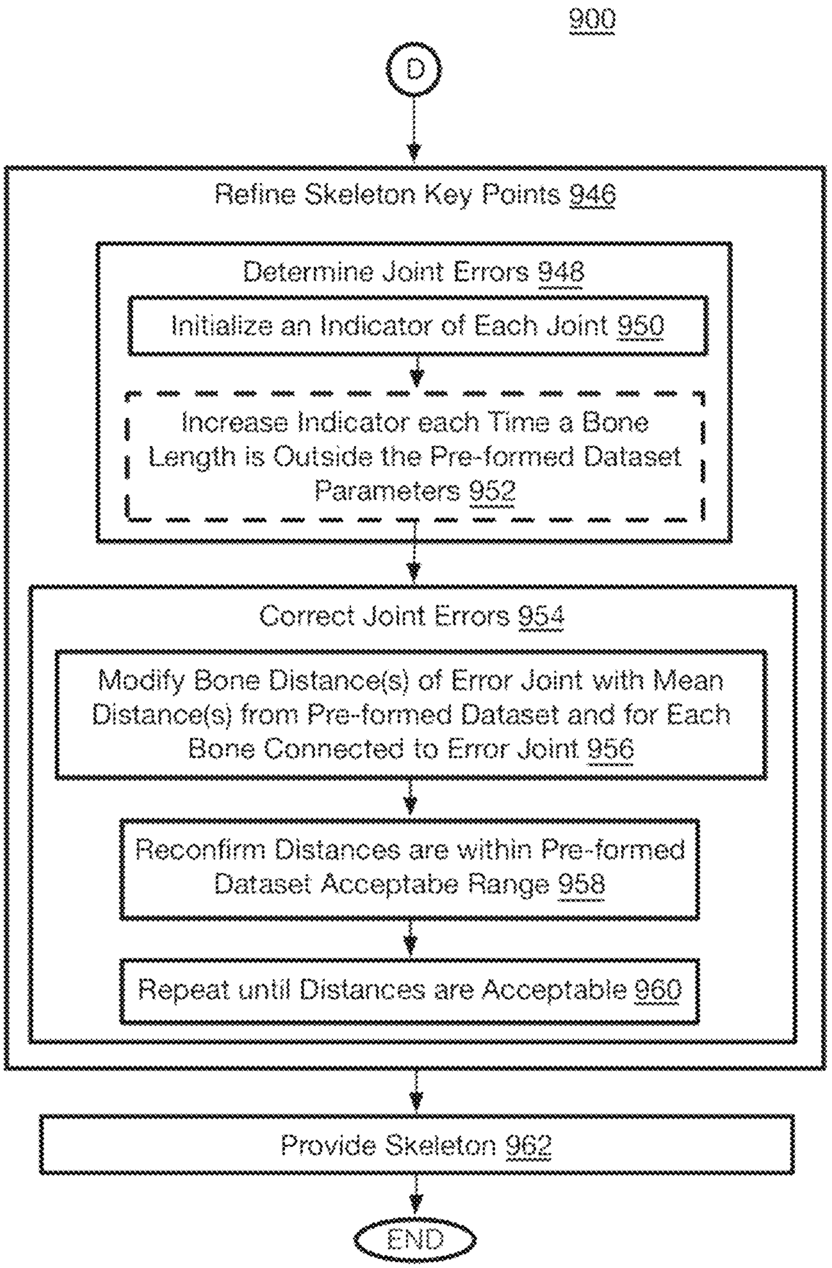

Referring now to FIGS. 9A-9C, an example detailed process 900 for multi-view image processing with accurate skeleton reconstruction is described according to at least one of the implementations herein. Process 900 may include one or more operations, functions or actions as illustrated by one or more of operations 902 to 962 generally numbered evenly. By way of non-limiting example, process 900 may be described herein with reference to example image processing systems 700 and 1400 of FIGS. 7 and 14 respectively, and where relevant.

Process 900 may include "generate 3D candidate locations" 902, and as formed by the candidate 3D point unit 704 (FIG. 7) for example. Here, the system generates 3D points at joints in 3D space from the 2D pose points provided from the association operation described above. To accomplish this, process 900 first includes "obtain 2D pose clusters" 904. Thus, the 2D pose points may be arranged, or considered to be arranged, into 2D pose clusters for each joint where the 2D pose points of all of the views of a same athlete or person (or single skeleton) and for a single joint on the skeleton are collected to form a cluster. It will be understood that this is simply a way of conceptualizing the data, and the data may or may not actually be collected into clusters. The 2D pose data simply may be listed by correspondence and may be used in a certain order or memory location as if in a 2D pose joint cluster but could be used in a different order or memory location.

This also may include "obtain points with pose confidence values" 906. Specifically, to improve the accuracy of candidate points, confidence values of the 2D pose points are used to filter out unreliable outliers. For each 2D point (or joint) in a pose estimation, each 2D pose point may be represented as p=[x, y, conf], where x and y are the coordinates of a joint inside a 2D bounding box, and conf is a pose confidence value of this point (or prediction). See Wang, J. et al., "Deep High-Resolution Representation Learning for Visual Recognition", IEEE, Transactions on Pattern Analysis and Machine Intelligence (2020). Such an example confidence value represents a probability that a point actually is a joint and may be based on the use of neural networks that use input image data from heatmaps, for example, to detect joints. The lower the confidence value, the more unreliable the joint location. Other algorithms to compute such pose confidence values could be used instead. It will be understood that such an operation to generate the pose confidence value may be performed earlier during the pose estimation stage as the 2D pose points are estimated and associated, but could be generated here as part of the preliminary stages of the skeleton reconstruction operations and specifically the generation of the candidate 3D points described here.

Process 900 may include "remove outliers" 908. This involves removing the 2D pose points where the pose confidence value may be used to determine which 2D pose points should be dropped. By one example, this is accomplished by having process 900 "perform multi-view pairwise calculations" 910, where the confidence value of paired 2D points from different views but for the same joint (or same 2D pose point cluster) are obtained. Each point in the 2D pose point cluster for a single joint is paired with all of the other points in the same 2D pose point cluster. This is repeated for each joint. Once the points are paired, the pairs are each or individually used to generate a candidate 3D point.

Figure 10:
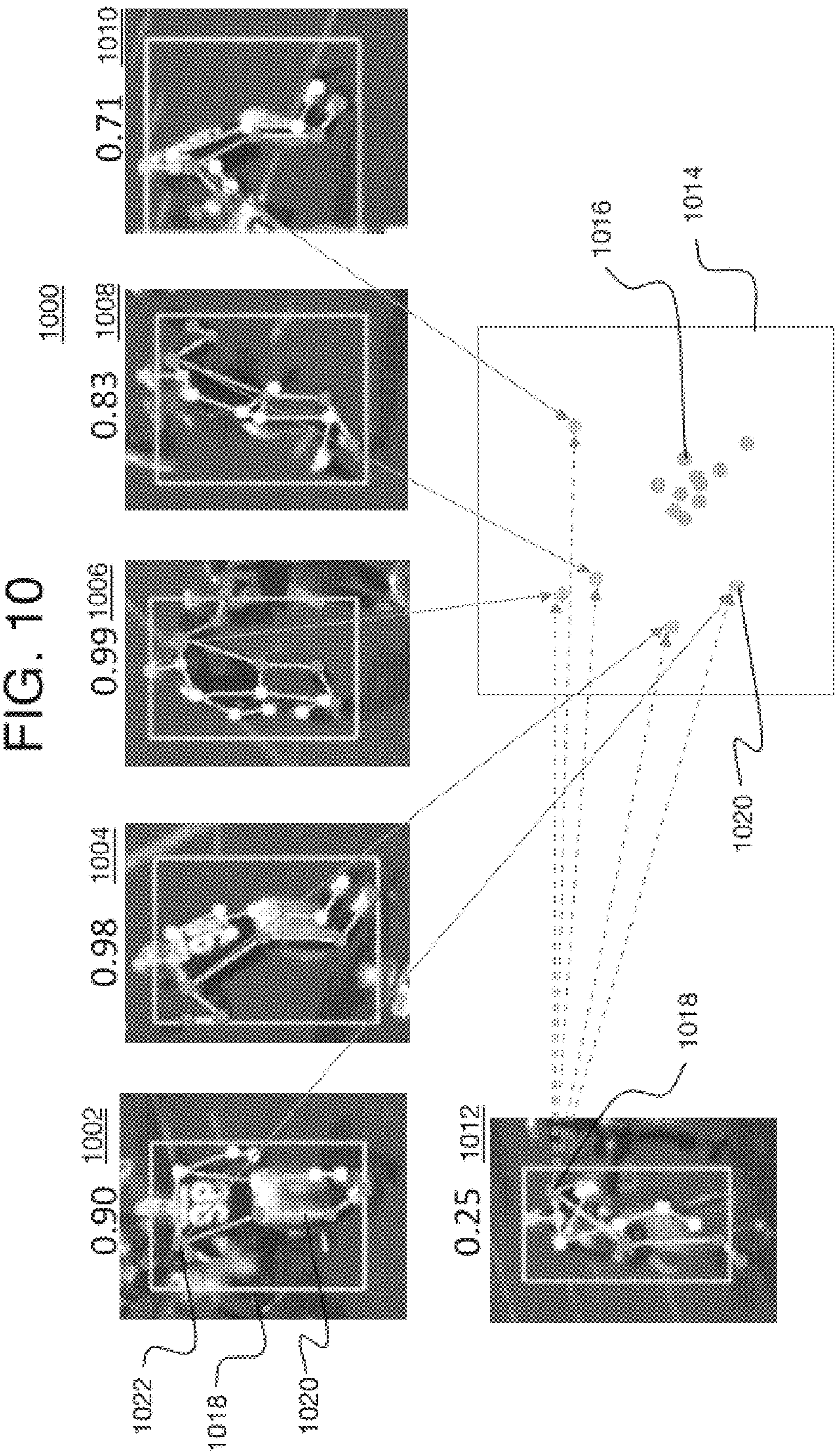
FIG. 10 is a schematic diagram to show skeleton reconstruction operations using pose confidence values according to at least one of the implementations disclosed herein.

Referring to FIG. 10, an example setup 1000 may be used to explain use of the 2D pose confidence values. Images (or 2D bounding boxes or poses) 1002, 1004, 1006, 1008, 1010, and 1012 each show a pose, and represent a 2D pose point, here being the left shoulder. Pose 1012 has left shoulder point 1018. A 2D pose confidence value of an example joint in the image, here being the left shoulder of each pose, is provided above each respective image. Each 2D pose point is paired with each (or individual ones) of the other 2D pose points to generate a 3D point for each pair. A left shoulder or joint cluster 1014 represents the candidate 3D points generated by using the pairs.

This operation then may include "only keep 2D point pairs with both points that have a pose confidence value over a threshold" 912. Here, a threshold of 0.4 was determined by experiments to filter out untrusted 2D pose points. As shown on the setup 1000, image 1012 has a confidence value of 0.25 which is below the threshold of 0.4. Thus any pair with the left should point of the pose in image 1012 will be dropped so that no 3D point is generated using the left shoulder point from pose or image 1012. As shown on initial candidate 3D point cluster 1014, those pairs with left shoulder pose point 1018 will be dropped or ignored, so that candidate 3D point 1020 (and the pairings with the other poses 1002-1010 as shown in dashed line) for example, will not be computed. Other candidate 3D points 1016 will be generated that result from pairings among poses 1002-1010. The result is that a single 2D pose point with a low pose confidence value can be considered dropped when it has no valid pairs. This can significantly reduce the negative impact from false pose detection.

Process 900 may include "generate 3D key point clusters using valid pairs" 914, where point triangulation methods then may be used with each valid pair of 2D pose points of the same joint, or in other words every two camera views, to generate candidate 3D points. Algorithm 1 below provides the pseudo code for the initial candidate 3D point generation from the 2D pose points, and this is repeated for each joint of a skeleton (or single person).

Example Code for initial candidate 3D point generation for a single joint:

Algorithm 1: use confidence to reconstruct candidate point set

```
Input: point list P_list: [P_1, P_2, ... ]; correspondence projection matrix list
P_matrix: [M_1, M_2, ... ] ;
Output: point candidate set S: [N × 3]
for i in range(len(P_list)):
  for j in range(i, len(P_list)):
    if P_i[conf] > 0.4 and P_j[conf] > 0.4:
      3D_loc=triangulation(P_i, P_j, M_i, M_j)
      S.append(3D_loc)
```

Process 900 then continues with skeleton fitting and may include "fit 3D candidate key point locations to pre-formed skeleton data" 916. This operation first may involve selecting the joint to be processed. Thus, process 900 may include "select unfinished joint" 918. Specifically, the joints may be processed in an order to assist with accuracy and reduce carry over of errors from one to joint to a next. Thus, joints typically with higher accuracy may be analyzed before joints known to have lower accuracy. For example, the head and neck are easier for an image system to recognize versus limbs due to occlusions in the images for example. This tends to provide more stable fitting results for the subsequent joints. All joints being tracked here are listed below in an indexing table 2 and in processing order for stability.

TABLE 2

Index value and description for each joint

| index | Description |
|---|---|
| 0 | Head top |
| 1 | Neck |
| 2 | Right shoulder |
| 3 | Right elbow |
| 4 | Right wrist |
| 5 | Left shoulder |
| 6 | Left elbow |
| 7 | Left wrist |
| 8 | Right hip |
| 9 | Right knee |
| 10 | Right ankle |
| 11 | Left hip |
| 12 | Left knee |
| 13 | Left ankle |

When the processing of a skeleton up to the generation of the initial candidate 3D points is not already in the processing order established by Table 2, the system may wait for the joint data to process in the order as provided by Table 2. Either way, the skeleton fitting proceeds by comparing points in two different candidate 3D point clusters (or joints) and at least one of the two clusters should be an unfinished cluster (or joint) that was not already reduced to only a single joint point.

In order to determine whether both joints being compared still have multiple candidate 3D points, or only one of the joints being compared still has candidate 3D points, process 900 may include the inquiry "center of cluster already known on one connected joint?" 920. This refers to whether or not the joint already has its single joint point. If one of the joints (or clusters) already has the single joint point, then the process proceeds differently at operation 940 described below.

Here, it is assumed that neither joint has a single joint point yet. The skeleton fitting then proceeds with one current candidate 3D point at a time on a current (or first) cluster or joint. In this case, process 900 may include "obtain cluster points on other cluster" 922, where the 3D points on the cluster or joint being paired with the current cluster are obtained. The distances from points on one paired (current) joint cluster to the points on the other joint cluster will be analyzed to determine whether a candidate 3D point is valid and should remain in the current cluster.

Figure 11A:
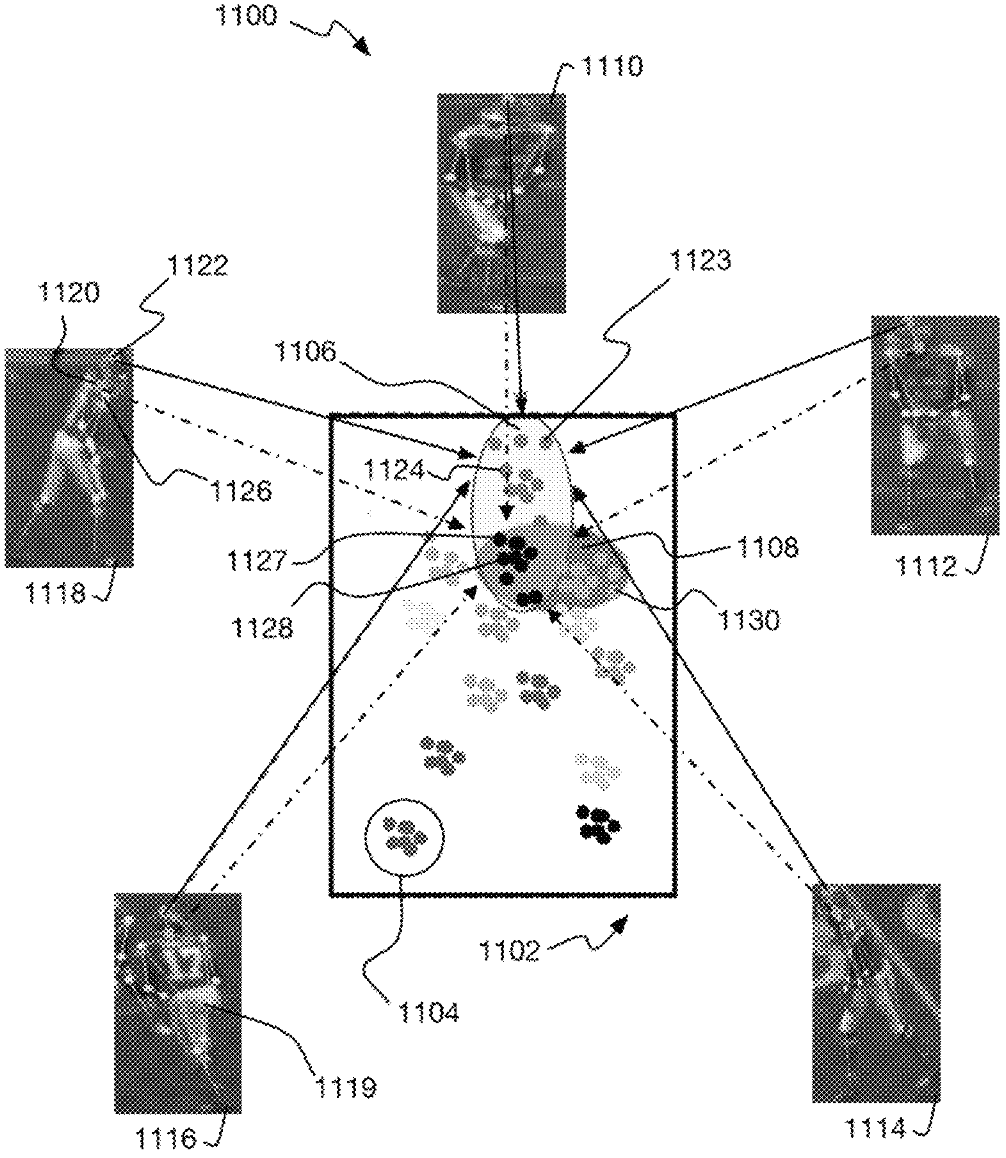
FIGS. 11A-11C are schematic diagrams to show skeleton fitting operations with joint confidence values according to at least one of the implementations herein.

Referring to FIG. 11A to exemplify the joint pairing for skeleton fitting, a setup 1100 has five associated bounding boxes (or images) 1110, 1112, 1114, 1116, and 1118 from five camera views for a specific athlete 1119, each image showing a skeleton pose with joints. At this stage, a rough 3D space skeleton 1102 has each joint formed of a cluster 1104 of candidate 3D points for 14 joints or clusters as with skeleton 300 (FIG. 3), and with each point in the cluster 1104 from a different one of the views 1110, 1112, 1114, 1116, and 1118. For example, candidate 3D points 1123 in a head joint cluster 1124 are formed from the 2D pose head points 1122 (as shown by the solid arrows), while candidate 3D points 1127 of a neck joint cluster 1128 are formed from the 2D pose neck joint points 1120 (as shown by the broken line arrows) as explained above to generate the candidate 3D points in the first place, and as explained on FIG. 10.

Here on setup 1100, two joint pairings are to be analyzed one after the other. First, a cluster pairing 1106 (shown as an oval) will compare the current candidate 3D points 1127 in the neck joint cluster (or current cluster) 1128 to 3D points 1123 in the head joint cluster 1124 (the other cluster). This comparison will be explained with FIG. 11B. Thereafter in a pairing 1108, the neck cluster 1128 will be compared to a left shoulder joint cluster 1130.

To perform these cluster pairings, process 900 may include "obtain distances from current candidate 3D point of current cluster to multiple points of other cluster" 923, where the current and other clusters are the two clusters being compared (or distanced) as mentioned. The distances represent a bone length or a distance between joints on a skeleton, that are to be reconstructed for the skeleton, and as described with FIG. 3. This also involves computing the distance from the current candidate 3D point to each or multiple 3D points on the other cluster (or only one point if only one point exists). The distance may be in three dimensions and is a Euclidean distance in the present examples, although other distance algorithms could be used.

Process 900 may include "obtain joint confidence of individual 3D points" 924, where the individual distances from the current candidate 3D point and to the 3D point on the other cluster are each associated with a joint confidence value in order to validate the accuracy of the current candidate 3D point. Preliminarily, this may have process 900 include "initialize confidence values" 926.

Particularly, the method may define a joint confidence $C_{ik}$ for each candidate 3D point (or 3D skeleton point) $S_{ik}$ in the current joint cluster (or candidate point set) $S_i$, where $S_i$ is the joint cluster (or set of candidate points) of joint i (where i may be indexed in Table 2 above). Also then, $S_{ik} \in S_i$, and k=1, 2, . . . , $M_i$, where $M_i$ is the total number of candidate 3D points in set $S_i$. Joint confidence values $C_{ik}$ all may be initialized to 0 for all skeleton candidate joint locations.

Thereafter, process 900 may include "increase confidence value each time a distance between point pairs of connecting joints meets a criterion based on a pre-formed dataset" 928. Suppose a current joint i connects to other joint j in the skeleton 1102 being analyzed. To compute the confidence value $C_{ik}$, the distances between the current 3D point $S_{ik}$ and all or individual 3D points $S_{jm}$ on other cluster or set $S_j$ are each compared to at least one criterion based on the data or parameters from the dataset, and where m is the number of a 3D point in other cluster $S_j$. By one form, the criterion is an acceptable range of distances based on the standard deviation (or other deviation) from the dataset recorded as the maximum and minimum distances between each connecting joints being reconstructed. Thus, for the connections $S_{ik}$, $S_{jm}$, if the length, i.e., the distance between $S_{ik}$ and $S_{jm}$, is equal to, or within, the joint-to-joint or bone length range [min, max], then the distance is valid and the confidence value $C_{ik}$ will be increased.

By one approach, the confidence value $C_{ik}$ is increased by $1/M_j$ for each valid distance (or valid pair) of the current candidate 3D point $S_{ik}$, where $M_j$ is the total count of 3D points $S_{jm}$ in the other cluster or joint $S_j$, and in turn, the maximum possible number of valid distances between the current candidate 3D point $S_{ik}$ at the current joint i and the $M_j$ 3D points on the other cluster j. In this case, the maximum possible joint confidence value is 1.0. This is repeated for each distance computed for candidate 3D point $S_{ik}$ on cluster or set $S_i$.

Figure 11B:
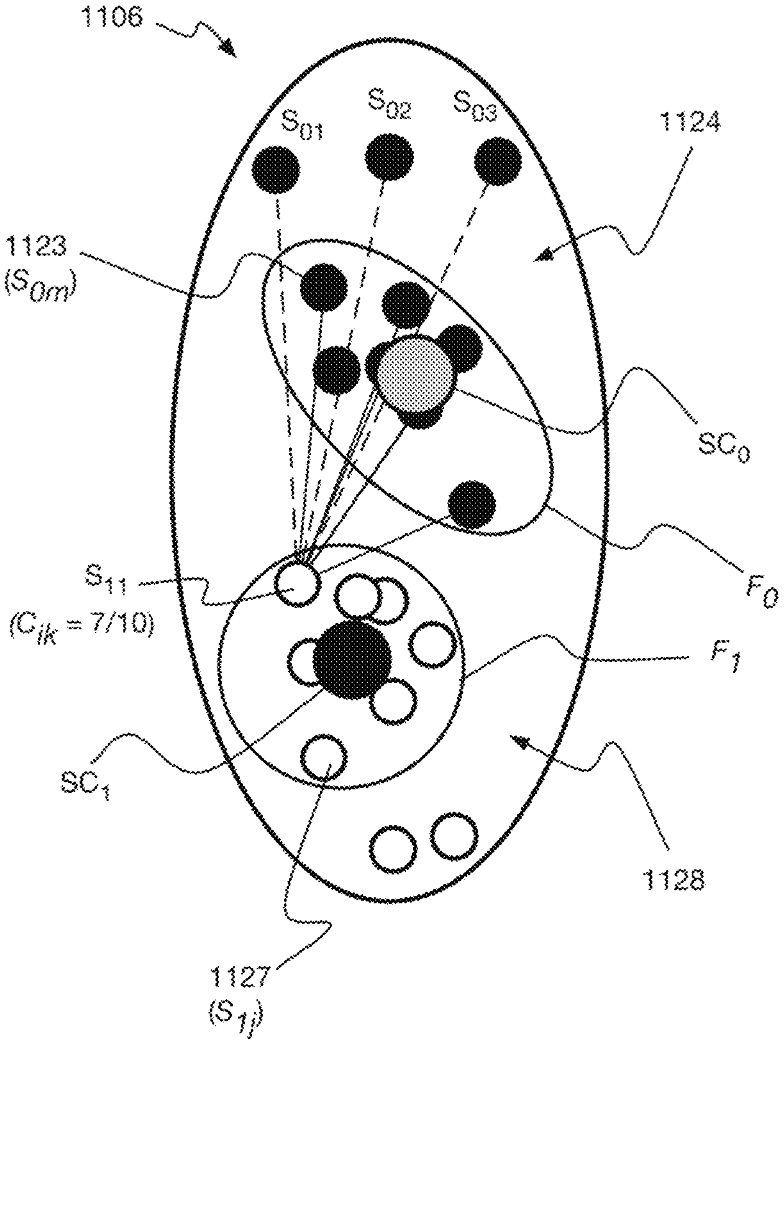

Referring to FIG. 11B as an example, cluster or joint pairing 1106 is between head (or head top) joint or cluster $S_0$ 1124 as the other cluster with 3D points $S_{0m}$ 1123 shown as solid dots, and neck joint or cluster 1128 as the current cluster with current candidate 3D points 1127 shown as unfilled dots. In this example, current candidate 3D point $S_{11}$ is being compared or distanced from the individual 3D points $S_{0m}$, and by one form to each of the points $S_{0m}$, in the head cluster $S_0$. Assume ten 3D points are in the head cluster $S_0$ (so that $M_j$=10 for example). If the length of a distance ($S_{11}$, $S_{0m}$) falls within the acceptable range [min, max] from the data of the dataset, then the confidence value of $S_{11}$ may be increased by 1/10, where 10 is the total number of 3D points $S_{0m}$ in the head cluster $S_0$. The solid lines on cluster pair 1106 indicate the length of distance ($S_{11}$, $S_{0m}$) satisfies (or passes or meets) the criterion and is valid, while dashed lines indicate the length is invalid.

Continuing with the example from comparison 1106, seven of the ten 3D points $S_{0m}$ are valid so that the total joint confidence value $C_{ik}$ is increased from 0 to 7/10 (0.7) to represent the confidence of $S_{11}$ being a joint point. The distances from the current candidate 3D point Sn and to the 3D points $S_{01}$, $S_{02}$, and $S_{02}$ are too long to fit within the criterion and are dropped so that these distances do not contribute to the total joint confidence value of current candidate 3D point $S_{11}$.

Process 900 then performs "include 3D points with total joint confidence value that meets a criterion" 930, where the total joint confidence value then is compared to another criterion. For this operation, the process 900 may include "include 3D point that meets pre-formed dataset parameters when paired with at least a minimum proportion of points in another cluster" 932, and to be included or maintained in the current cluster to be used to generate a single joint point. By one form, if the total joint confidence value $C_{ik}$ is larger than 0.5 (as the criterion), the kth candidate 3D point $S_{ik}$ in joint set $S_i$ is added to a reduced or valid skeleton point set $F_i$, which is shown on FIG. 11B. In other words, the current candidate 3D point $S_{11}$ is maintained in the cluster when the proportion of 3D points $S_{0m}$ in the paired cluster that meet the dataset parameters is at least half of the 3D points $S_{0m}$ in this example. In this case, since the joint confidence value $C_{ik}$ is 0.7 for candidate 3D point $S_{11}$ is larger than the $C_{ik}$ of 0.5, the candidate 3D point $S_{11}$ is selected to be maintained in a valid cluster or set $F_1$. The maintained candidate 3D points $S_{ik}$ in valid set $F_1$ of the neck cluster 1128 are shown on FIG. 11B. The reverse may be performed so that maintained candidate 3D points $S_{0m}$ may be maintained in a valid set $F_0$ of the head cluster 1124 as well.

Process 900 also may include "if no 3D point in cluster passes criterion, add point(s) with maximum joint confidence" 934. Thus, in this example, if all candidate 3D points $S_{ik}$ in a cluster have total joint confidence values $C_{ik}$ in set $S_i$ that is smaller than 0.5, then the candidate 3D points $S_{ik}$ that have a joint confidence value $C_{ik}$ equal to the largest joint confidence value $C_{ik}$ in the cluster $S_i$ are still added to the valid set $F_i$. This could be one or more candidate 3D points. The consistently low total joint confidence points in a single cluster can occur because the pose estimation (or pose confidence values) was simply inaccurate or the association result of a particular person (or skeleton) is not correct. For example, one player may have five bounding boxes each from a different camera view). Say three of the bounding boxes from a different person. This can happen when athletes are grouped together or near each other for example. Then, the calculated joint confidence value of each 3D point will be low (less than 0.5 for example). Another possible case where the joint confidence values all may be low is when the 2D joint of a person is switched between left and right sides. For example for four bounding boxes of a person, the left and right elbows are all labeled left and right incorrectly. In other words, the bounding boxes may have an athlete facing the wrong direction. In this case, the final joint confidence values may be less than 0.5. Generally, if more than half of the results in 2D poses is not correct (more than half of the confidence values for a single joint in all bounding boxes for example), the final joint confidence value will most likely be less than 0.5.

Process 900 may include "determine representative joint point from valid included points in cluster" 936. In other words, for each joint or cluster, a single joint point is generated by using the remaining candidate 3D points of the valid cluster $F_i$. Many different algorithms may be used to find the representative location of the cluster. By one approach, process 900 may include "use mean-shift" 938. In this example, mean-shift may be used to select the representative joint point (or skeleton joint center) $SC_i$ of the candidate set $F_i$ as the output skeleton single joint point, and which may or may not be an actual center point of the cluster. Generally, a mean-shift algorithm is an iterative process that defines a number of cluster diameter ranges or bandwidths where points farther out from a center of the cluster are given lower weights. The center of the bandwidths is recalculated each iteration until it converges to a single point. See, Yang, C., et al., "Mean-shift analysis using quasinewton method", s[C]//Proceedings, International Conference on Image Processing (Cat. N., 03CH37429), IEEE, 2: II-447 (2003).

Referring again to FIG. 11B, and using the mean-shift algorithm on each valid set $F_i$, the neck cluster 1128 converged to a single joint point $SC_1$, while the head cluster converged to a single joint point $SC_0$.

When a current cluster or joint directly connects to multiple other unfinished connecting joints, this can be handled in a number of different ways. For example, suppose a current joint cluster is a shoulder joint cluster connected to a neck joint cluster, an elbow joint cluster, and a hip joint cluster. Say for the neck and elbow joint clusters, a current candidate 3D point at the shoulder joint cluster is invalid, but when using the hip joint, the current candidate 3D point is valid. By one approach, the current candidate 3D point will be maintained in the valid set $F_i$ as long as the candidate 3D point is valid for one connecting other joint. By another approach used in the examples herein, if the candidate 3D point is invalid for any connecting joint, then the candidate 3D point is dropped immediately for any subsequent connections. By yet another option, each connection may have its own valid subset and its own initial center (or really converged) joint point. In this last case, the multiple center joint points could then be combined into a final single joint point for a joint, whether by mean-shift, averaging, interpolation, or other combination algorithm.

Figure 11C:
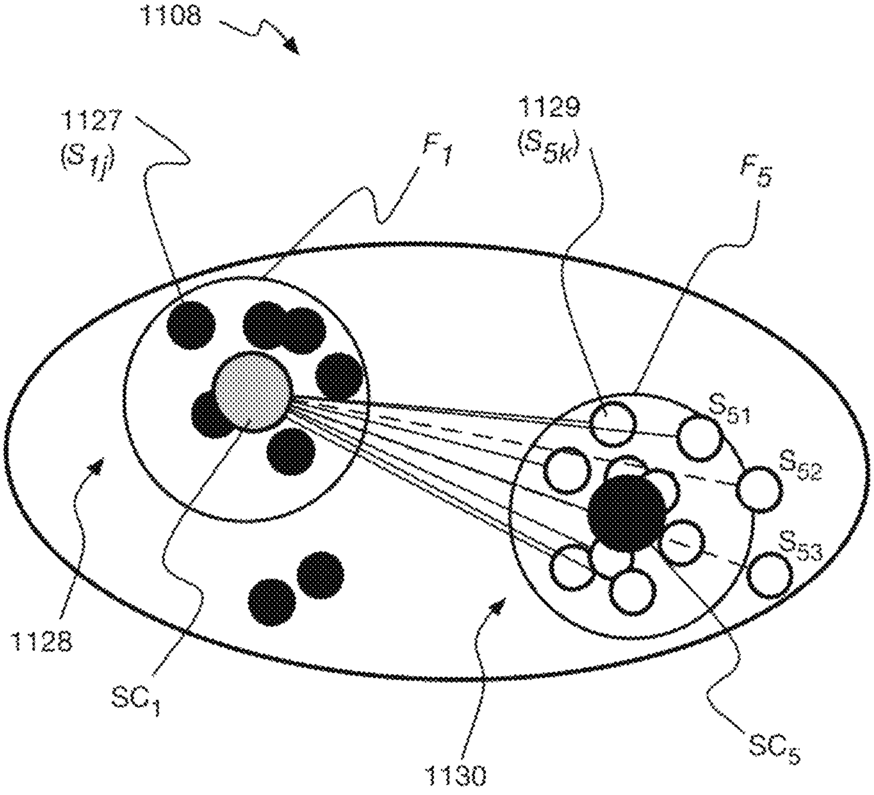

Referring now to FIG. 11C and returning to operation 940 when one of the two clusters being used to generate the distances already has its final joint point $SC_i$, process 900 may include "use bone distance from pre-formed dataset to determine included candidate 3D points" 940. The cluster comparison 1108 shows this situation. For example, the cluster comparison 1108 has the neck cluster 1128 with a single joint point $SC_1$ already generated with cluster comparison 1106 (FIG. 11B). The neck joint $SC_1$ now can be used to remove invalid candidate 3D points from a next joint or cluster, such as a left shoulder cluster 1130 $S_5$ with candidate 3D points $S_{5k}$ 1129. The candidate 3D points 1127 of the neck cluster 1128 (shown as solid dots) do not need to be used any longer for the candidate 3D point validation.

In this case, a distance from the neck joint point $SC_1$ to each or individual candidate 3D point $S_{5k}$ in the left shoulder candidate point set $S_5$ is determined. Each distance is then compared to another criterion based on the data of the dataset, and particularly, again, the acceptable joint-to-joint distance or bone length range [min, max]. If a distance between the single joint point $SC_1$ and one of the candidate 3D points $S_{5k}$ is at or within the acceptable distance range [min, max], the candidate 3D point $S_{5k}$ is added to a reduced or valid point set $F_5$. The solid lines on cluster comparison 1108 show the connections with valid left shoulder candidate 3D points that are maintained in valid cluster or set $F_5$ in order to be used to generate a single left shoulder joint point $SC_5$ according to operation 936 above. On the other hand, the dashed lines show the invalid points that may not be considered to generate the single joint point $SC_5$ at the left shoulder joint 1130. This is a more direct route to determine candidate 3D point membership in the valid set $F_i$ than using the joint confidence value described above, thereby reducing computational load and time consumption.

Also, it will be understood that when a current single joint point $SC_i$ for a current cluster or joint i (joint 1 (1128) for example) already exists, the invalid points on the other cluster (joint 5 (1130)) will be removed from consideration even though a contribution from other joints connecting to the joint 5 (1130) have not been analyzed yet. Thus, for the example cluster comparison 1108 (FIG. 11C), points $S_{52}$ and $S_{53}$ are removed from subsequent consideration for left elbow cluster 6 and left hip cluster 11. This further increases accuracy and reduces the computational load and time consumption.

Process 900 may include the inquiry "last joint?" 942. If the present skeleton being constructed still has joints without a single joint point, then the process loops back to operation 918 to obtain the data of a next unfinished joint to be constructed.

Otherwise, once all of the joints being constructed on a present skeleton each have a single joint point, process 900 may include "refine skeleton key points" 946. This may be considered a post-processing operation since the skeleton is already constructed according to the skeleton fitting operations.

The refining may be used to increase accuracy when all joint confidence values $C_{ik}$ of the candidate 3D points $S_{ik}$ in a joint set $S_i$ are smaller than the criterion (0.5 in the example above), and the candidate 3D points with a maximum joint confidence value were used to generate the single joint point of the joint i. This should usually result in a good skeleton reconstruction. However, this maximum joint confidence value skeleton reconstruction operation still may generate a poor quality skeleton with a joint in an erroneous location. Basically, when the maximum joint confidence value is less than 0.2, the probability of the joint being in the correct location is significantly reduced. The refinement procedure here corrects the error and shifts the joint to a correct location.

Figure 12A:
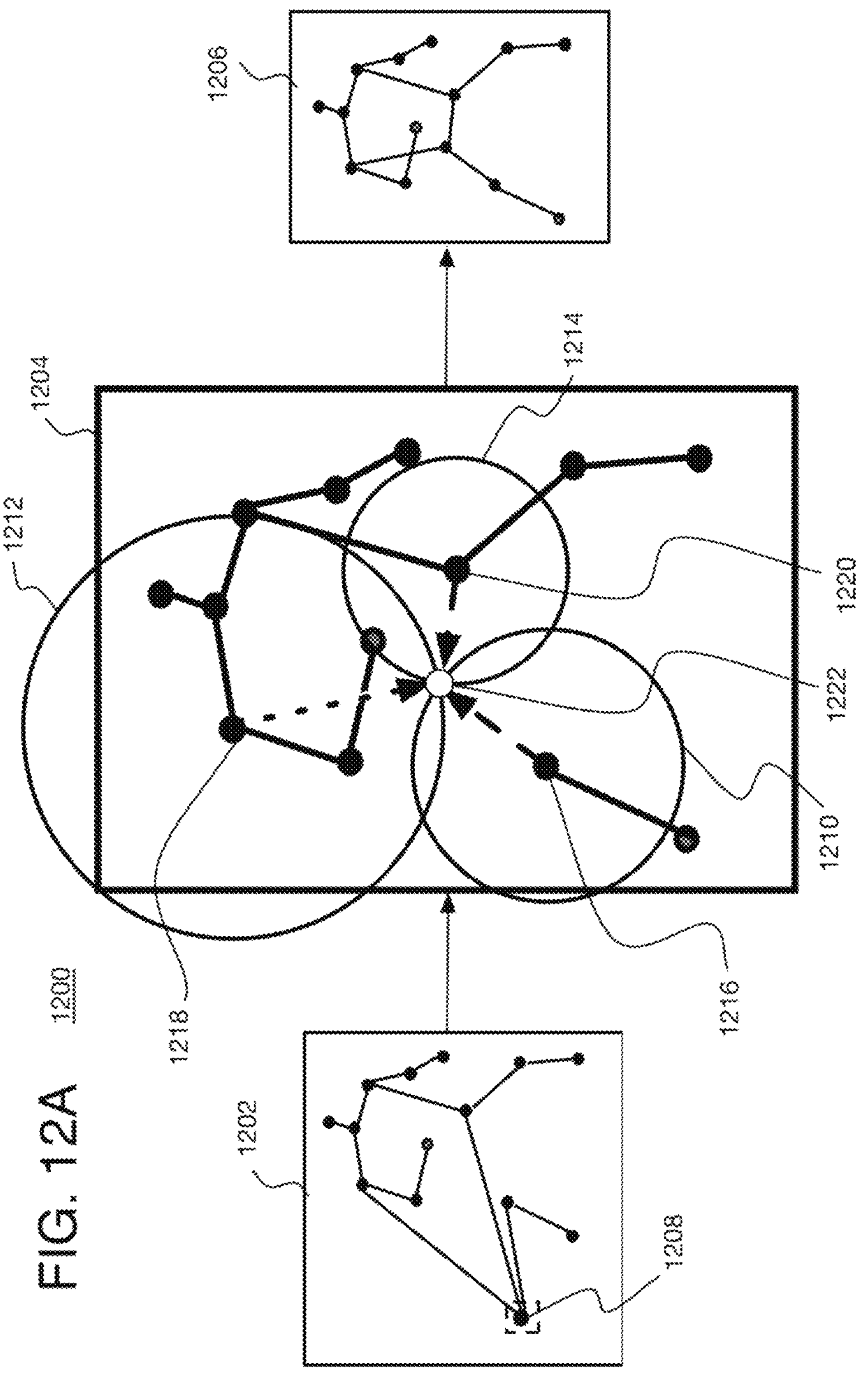
FIG. 12A is a schematic flow diagram showing a skeleton refining operation according to at least one of the implementations herein.

Referring to FIG. 12A, a refinement operation 1200 shows a before skeleton 1202 with a hip joint 1208 in an erroneous location, a joint shifting operation 1204, and an after or resulting skeleton 1206 with the hip joint in the correct location. To accomplish this, process 900 may include "determine joint errors" 948. This may begin with "initialize an indicator of each joint" 950. Here, the system sets an indicator $n_i$ for each skeleton joint i to zero.

Process 900 then may include "increase indicator each time a bone length is outside the pre-formed dataset parameters" 952. This involves calculating the bone length (or distance) between joint i and joint j. The distance is then compared to a criterion, such as from the data of the dataset, and here the acceptable range of distances in the dataset data. If the distance does not meet or satisfy the criterion, then both joint indicators $n_i$ and $n_j$ are increased by one. The bone length distances between all joints may be iteratively calculated for a person or skeleton. For each joint with an $n_i \geq 1$, the joint location is in error. The joints with erroneous locations may be stored in an error list E. The indicator is used because to find the error joints. For example, a left lower arm connects a left wrist to a left elbow. If the distance between the generated left wrist and left elbow is outside the acceptable range for the left lower arm in table 1, then at least one of the joints is wrong. The indicator (add+1) for this joint is set in order to determine which joint is in error. (the wrist can while the elbow will have an indicator of two if the error is at the elbow.

Process 900 may include "correct joint errors" 954, and this may include "modify bone distance(s) of error joint with mean distance(s) from pre-formed dataset and for each bone connected to error joint" 956. Thus, after the error joint list E is obtained, the joint location of a particular joint is corrected by using adjacent joint locations.

Specifically, when an end joint (wrist, for example) has a single adjacent joint, the adjacent joint point remains fixed and the end joint point is moved (or pulled) inward along the same trajectory established by the direction between the adjacent joint and the initial error end joint. The end joint is moved or pulled toward the adjacent joint until the distance between them is the mean distance between that (left or right) elbow and wrist joint in the data from the dataset.

When the error joint has more than one adjacent joint, the error joint will be between, and interconnect, the adjacent joints. A trajectory will be established between the error joint and each adjacent joint. In this case, the correct joint location for the error joint is at the intersection of circles centered at each adjacent joint and having a radius of the mean distance from the data of the dataset and from the type of adjacent joint to the type of error joint. This intersection of mean distances is deemed the correct joint location for the error joint.

Referring again to FIG. 12A for example, a right hip joint 1208 is an error joint that is out of place and makes the skeleton 1202 look deformed. The right hip joint connects with three adjacent joints including a right shoulder joint 1218, a right knee joint 1216, and a left hip joint 1220. To determine a correct right hip joint location 1222 for the error location 1208, the system may place a circle 1210, 1212, and 1214 respectively centered at each adjacent joint 1216, 1218, and 1220 and with a radius of the mean distance between the joints from the data of the dataset. The intersection of the circles is the correct right hip joint location 1222. The result is the correct skeleton 1206.

Figure 12B:
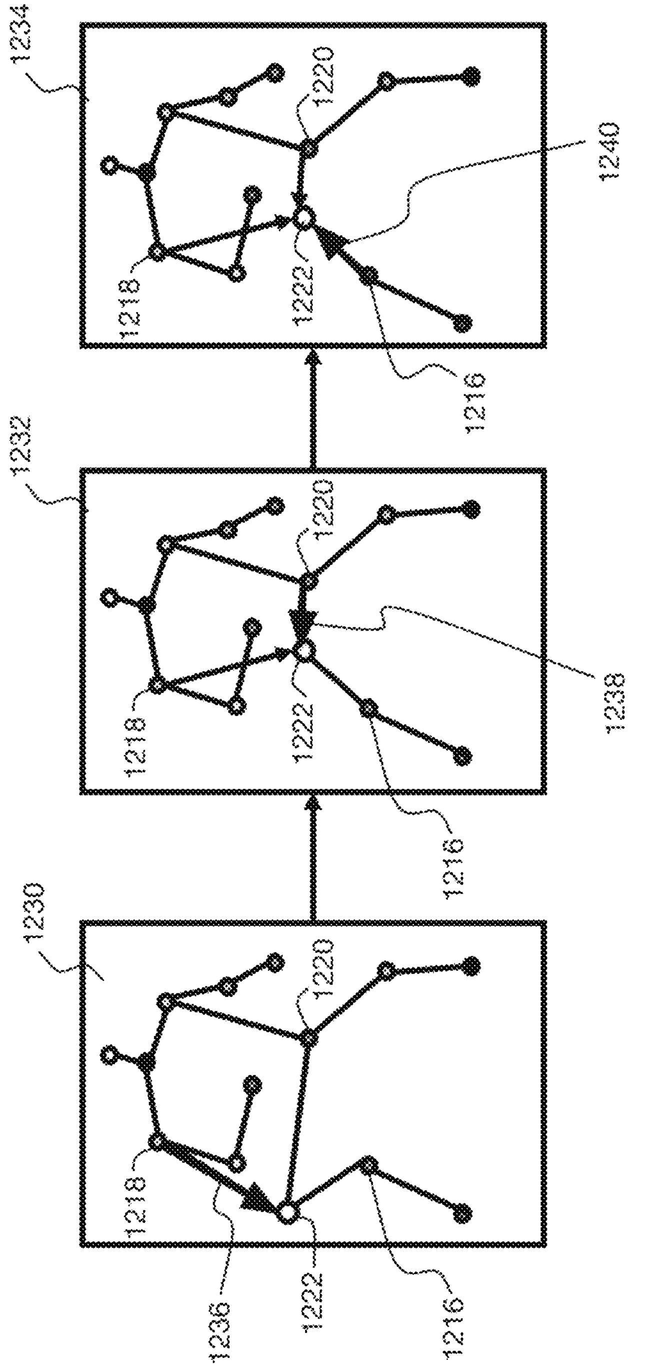
FIG. 12B is another schematic flow diagram showing a skeleton refining operation according to at least one of the implementations herein.

Referring to FIG. 12B, in order to perform this shift from the error location to the correct location for a joint in an efficient algorithm, the error joint may be moved (pushed or pulled) along the trajectories established by the error joint and the adjacent joints, and for one adjacent joint at a time. For example, the joint shifting operation 1204 may include shifting the error joint 1208 (now shown as hip joint 1222)

in one stage for each present adjacent joint. Thus in the case of hip joint 1222, three adjacent joints 1216, 1218, and 1220 have direct connections with bone lengths to the hip joint 1222 so that this process can be accomplished in three stages (or three resulting skeletons) 1230, 1232, and 1234. By one form, it should not matter what order the adjacent joints are handled.

First, the mean distance between the right hip joint 1222 and the right shoulder joint 1218 may be obtained from the data of the dataset. Then joint 1222, or actually error hip joint 1208 on skeleton 1202 (FIG. 12A), is pulled toward (or pushed away) from right shoulder joint 1218 along the original trajectory 1236 from shoulder joint 1218 to error hip joint 1208, which originally remains fixed in its angle relative to the other bone lengths. This results in skeleton 1230, and trajectory arrow 1236 shows the direction and angle of the measurement of the mean distance and the arrowhead indicates the mean is being measured from the right shoulder joint 1218 to the right hip joint 1222. The mean distance here in this example actually shortens the distance between the right hip joint 1222 and the shoulder joint 1218 so that the right hip joint 1222 may be considered to be pulled upward and along the trajectory 1236 and toward the right shoulder joint 1218 until the distance between the right shoulder joint 1218 and right hip joint 1222 is equal to the mean distance.

Then in the next stage, this process is repeated for adjacent left hip joint 1220 where the mean distance between hip joints from the data of the dataset is shorter than that with the erroneous joint 1208, so that replacing the erroneous distance with the mean causes the right hip joint 1222 to be pulled closer to the left hip joint 1222 along trajectory line 1238. It should be noted that once the mean distance for an adjacent joint is in place, the shifting of the error joint for the next adjacent point will change the trajectory of the bone length from the error joint to the earlier adjacent joints. Thus, for example, the pulling of the right hip joint 1222 toward the left hip joint 1220 has changed the direction of the prior trajectory 1236 on skeleton 1230. This is true for each subsequent adjacent joint relative to any earlier adjacent joint. The result in this stage is skeleton 1232.

Finally, the right hip joint 1222 is pulled downward toward adjacent knee joint 1216 along trajectory 1240 until the difference between the right hip joint 1222 and the knee joint 1216 equals the mean distance from the data of the dataset. The trajectory 1236 and now as well as trajectory 1238 will be changed while their lengths (equal to their respective mean distances) remain fixed. As mentioned, the resulting skeleton 1234 should be the same as the use of the intersecting circles.

Pseudo Code of the refinement procedure are provided in algorithm 2.

Algorithm 2: Joint Location Refinement

Input: reconstructed skeleton joint list $P_{list}$: [$P_1$, $P_2$, ... ]; joint connection list $L_{i,j}$: [$L_{0,1}$, $L_{1,2}$, ... ]; bone length range list $R_{i,j}$: [$R_{0,1}$, $R_{1,2}$, ... ]; skeleton joint indicator $n_i$: [$n_0$, $n_1$, ... ]
Output: skeleton joint list $P_{list}$: [$P_1$, $P_2$, ... ]

```
for i, j in connection list L_{i,j}:
   if dist(P_i, P_j) outside R_{i,j}:
      n_i += 1, n_j += 1
for i in range(len(n_i)):
   if n_i ≥ 1:
      E.append(i)
```

-continued

Algorithm 2: Joint Location Refinement

```
for i in E:
  find all connect joints Q_j to i and Q_j ∉ E
  while not all dist(P_i, P_Qj) inside R_i,Qj and iteration count < threshold:
      pull P_i to P_Qj in direction P_iP_Qj with distance=mean(R_i,Qj)
    threshold += 1
return P_list
```

Process 900 may include "reconfirm distances are within pre-formed dataset acceptable range" 958, where the distances are checked again per operation 948. For example, after the right hip joint 1222 is placed in the new location, the bone length from the new hip joint 1222 to the adjacent joints 1216, 1218, and 1220 may be determined. If all of the bone lengths are now within the acceptable range criterion of the data from the dataset, the right hip joint is considered to be in the correct location.

Process 900 may include "repeat until distances are acceptable" 960, where correction operation 956 is performed again. Thus, if it is found that the new hip joint location still has an error, the process is repeated until the new location is correct according to the data of the dataset.

Process 900 may include "provide skeleton" 962, where a process of skeleton tracking assigns a unique tracking ID to each player skeleton and generates the 3D trajectories of a player skeleton. The skeleton tracking or a single 3D skeleton itself may be used as described above.

EXPERIMENTS

To evaluate the effectiveness of the disclosed system and method, a dataset of 66 short multi-view clips of an actual athletic event (American football) was used for testing. The results listed in Table 3 below are based on PCK@0.5 m and PCK@0.2 m (see Andriluka, M., et al., "2D Human Pose Estimation: New Benchmark and State of the Art Analysis", Computer Vision and Pattern Recognition (CVPR, IEEE, 3686-3693 (2014)) to determine whether the correct tracking joints (or key points) are on a matching skeleton. This refers to a probability of correct key point (PCK), and more precisely, PCK@0.2 m and PCK@0.5 m to measure the accuracy of the reconstruction of a distance between a 3D predicted joint and a corresponding ground truth joint that is within 0.2 m or within 0.5 m, respectively.

By one form, skeletons with fourteen key points (or joints) were used as the skeleton key points as in FIG. 3. The results for these points are separated into eight columns below with left and right skeleton key points being averaged together in the same column (i.e., except for head and neck key points). Table 3 shows the numerical comparison of a conventional bundle adjustment method and the disclosed method. The present method performs better in both recall and precision, especially for the PCK@0.2 m metric. Even though the processing time increases, real time output was still maintained.

TABLE 3

The comparison with bundle adjustment method on NFL dataset

| | Method | Head | Neck | Shldr. | Elbow | Wrist | Hip | Knee | Ankle | Mn |
|---|---|---|---|---|---|---|---|---|---|---|
| 0.2 m precision | Bundle | 68% | 68% | 65% | 60% | 54% | 59% | 63% | 59% | 61% |
| | Discl. | 72% | 72% | 70% | 66% | 60% | 64% | 69% | 67% | 67% |
| recall | Bundle | 67% | 67% | 64% | 59% | 54% | 58% | 62% | 58% | 60% |
| | Discl. | 71% | 71% | 70% | 65% | 60% | 64% | 68% | 66% | 66% |
| 0.5 m precision | Bundle | 92% | 92% | 91% | 90% | 88% | 91% | 91% | 88% | 90% |
| | Discl. | 93% | 93% | 92% | 91% | 90% | 92% | 92% | 91% | 91% |
| recall | Bundle | 90% | 90% | 90% | 88% | 87% | 89% | 89% | 87% | 89% |
| | Discl. | 91% | 91% | 91% | 90% | 89% | 91% | 91% | 89% | 90% |

Figure 13A:
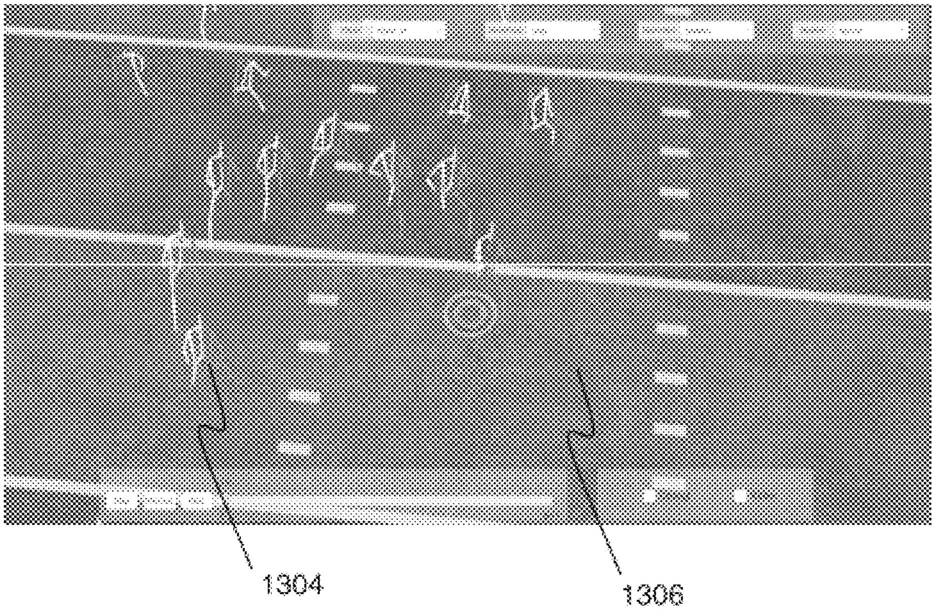
FIG. 13A is an image showing successfully constructed skeletons according to at least one of the implementations disclosed herein.
Figure 13B:
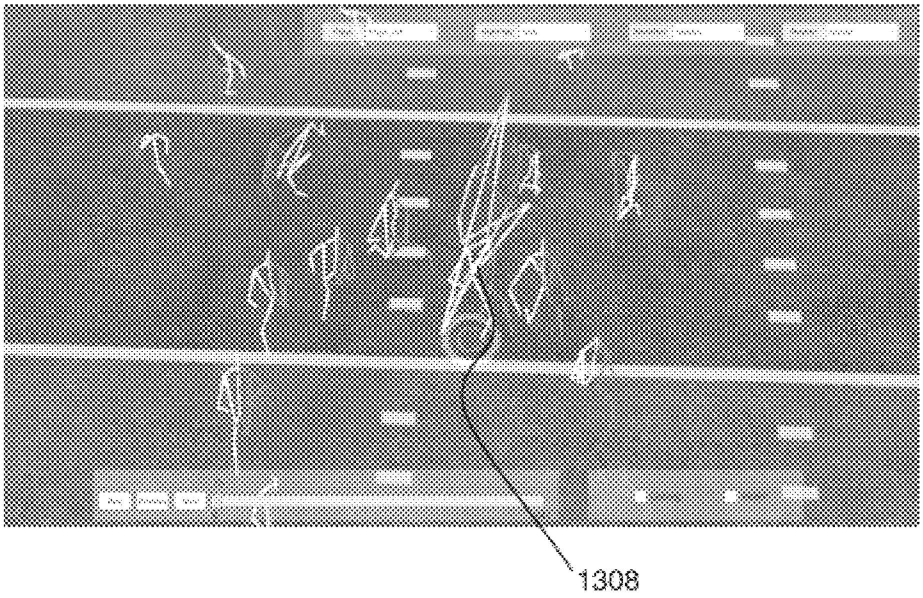
FIG. 13B is an image showing results of a conventional skeleton reconstruction.

Referring to FIGS. 13A-13B, images 1300 and 1302 provide a visual comparison between skeleton reconstruction and tracking methods. Image 1300 shows an example of skeleton tracking results in 3D space rendered using the disclosed process. Image 1302 is the result of using the conventional bundle adjustment method. As shown, the present method generates a much more reliable reconstruction result where each detected person or athlete 1304 on a field 1306 of an athletic event has a separate full and accurate skeleton versus that on the bundle adjustment image 1302 that resulted in badly deformed and indistinguishable skeletons 1308.

It will be appreciated that the processes 400, 500, 600, and 900 respectively explained with FIGS. 4-6 and 9A-9C do not necessarily have to be performed in the order shown, nor with all of the operations shown. It will be understood that some operations may be skipped or performed in different orders.

Also, any one or more of the operations of FIGS. 4-6 and 9A-9C may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 14:
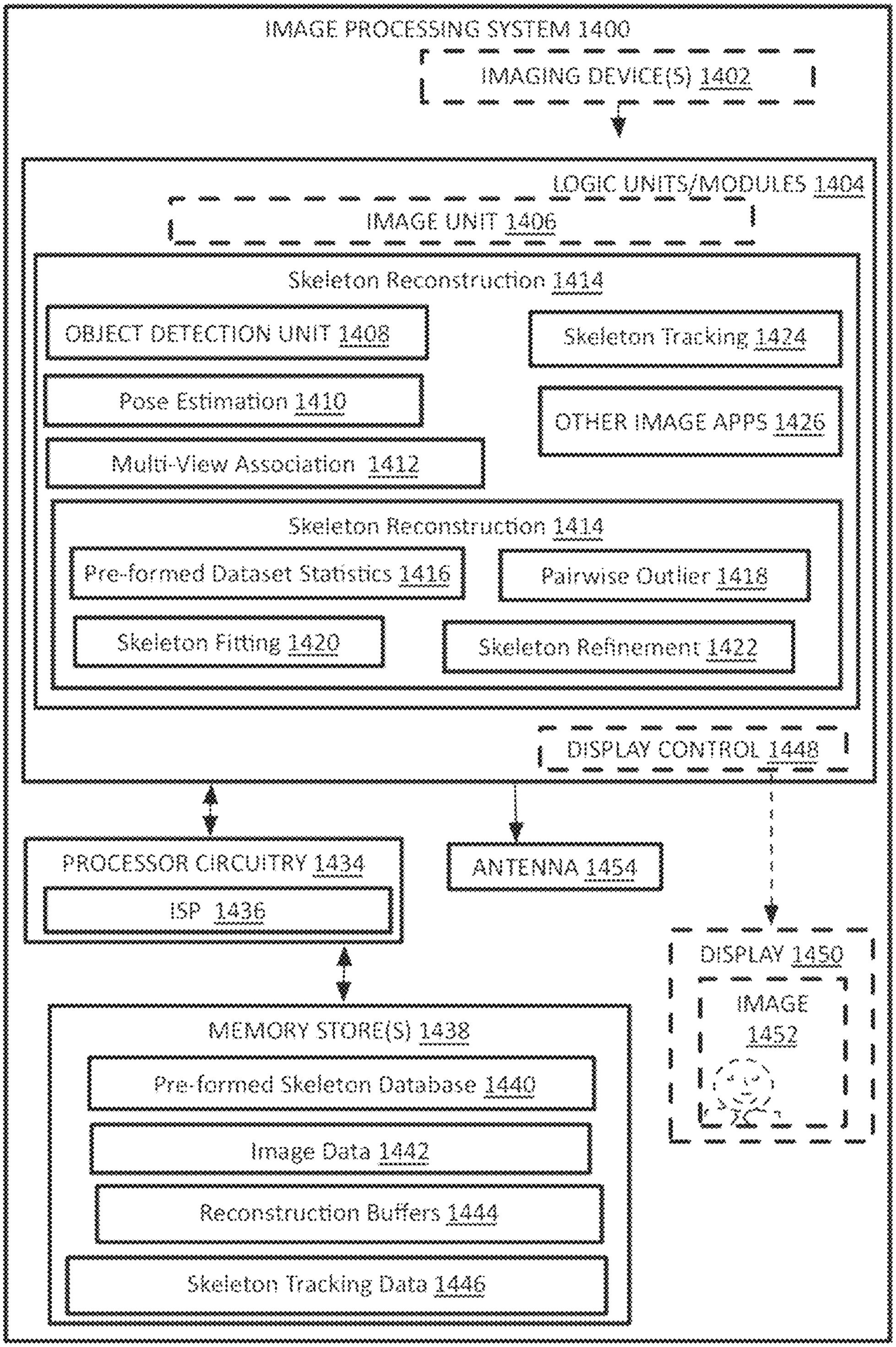
FIG. 14 is an illustrative diagram of an example system.

Referring to FIG. 14, an example image processing system 1400 is arranged in accordance with at least some implementations of the present disclosure. In various implementations, the example image processing system 1400 may have one or more imaging devices 1402 to form or receive captured image data, and this may include either one or more cameras such as an array of cameras around an athletic field, stage or other such event location and pointed toward athletic events or other types of objects in motion. Thus, in one form, the image processing system 1400 may be a digital camera or other image capture device that is one of the cameras in an array of the cameras. In this case, the imaging device(s) 1402 may be the camera hardware and camera sensor software, module, or component. In other examples, imaging processing system 1400 may have an imaging device 1402 that includes, or may be, one camera or some or all of the cameras in the array, and logic modules 1404 may communicate remotely with, or otherwise may be communicatively coupled to, the imaging device 1402 for further processing of the image data.

Accordingly, the part of the image processing system 1400 that holds the logic units 1404 and that processes the images may be on one of the cameras or may be on a separate device included in, or entirely forming, the image processing system 1400. Thus, the image processing system 1400 may be a desktop or laptop computer, remote server, or mobile computing device such as a smartphone, tablet, or other device. It also could be or have a fixed function device such as a set top box (cable box or satellite box), game box, or a television. The camera(s) 1402 may be wirelessly communicating, or wired to communicate, image data to the logic units 1404.

In any of these cases, such technology may include a camera such as a digital camera system, a dedicated camera device, web cam, or any other device with a camera, a still camera and so forth for the run-time of the system as well as for model learning and/or image collection for generating predetermined personal image data. One or more of the cameras may be RGB cameras or RGB-D cameras, but could be YUV or IR cameras. Thus, in one form, imaging device 1402 may include camera hardware and optics including one or more sensors as well as auto-focus, zoom, aperture, ND-filter, auto-exposure, flash, actuator controls, and so forth. By one form, the cameras may be fixed in certain degrees of freedom, or may be free to move in certain or all directions.

The logic modules 1404 of the image processing system 1400 may include, or communicate with, an image unit 1406 that performs at least partial processing. Thus, the image unit 1406 may perform pre-processing, decoding, encoding, and/or even post-processing to prepare the image data for transmission, storage, and/or display. It will be appreciated that the pre-processing performed by the image unit 1406 could be by modules located on one or each of the cameras, a separate image processing unit 1400, or other location.

In the illustrated example, the logic modules 1404 also may include an object recognition unit 1408, pose estimation unit 1410, multi-view association unit 1412, skeleton reconstruction unit 1414, skeleton tracking unit 1424, and other image apps 1426. The skeleton reconstruction unit 1414 has a pre-formed dataset statistics unit 1416, pairwise outlier unit 1418, skeleton fitting unit 1420, and skeleton refining unit 1422. These units or components may be used to perform the skeleton reconstruction as described herein. The logic units 1404 may perform the same tasks as that described above with similar titles. One or more downstream applications (other image apps) 1426 also may be provided to use the skeleton tracking matches and identification data to perform final action recognition and analysis, virtual view generation, and/or to perform other tasks.

These units may be operated by, or even entirely or partially located at, processor(s) (or more particularly, processor circuitry) 1434, such as the Intel Atom, and which may include a dedicated image signal processor (ISP) 1436, to perform many of the operations mentioned herein. The logic modules 1404 may be communicatively coupled to the components of the imaging device 1402 in order to receive raw image data. The image processing system 1400 also may have one or more memory stores 1438 which may or may not hold the image data being analyzed, pre-formed skeleton database data 1440, which could be the distances themselves and/or the statistical parameters or data, image data 1442, reconstruction buffers 1444, and/or skeleton tracking data 1446, to name a few examples. Other applications as well as other image data or logic units mentioned above may be stored as well. An antenna 1454 may be provided. In one example implementation, the image processing system 1400 may have at least processor circuitry 1434 communicatively coupled to memory 1438 to perform the operations described herein as explained above.

The image unit 1406, which may have an encoder and decoder, and antenna 1454 may be provided to compress and decompress the image date for transmission to and from other devices that may display or store the images. This may refer to transmission of image data among the cameras, and the logic units 1404. Otherwise, the processed image 1452 may be displayed on the display 1450 or stored in memory 1438 for further processing as described above. As illustrated, any of these components may be capable of communication with one another and/or communication with portions of logic modules 1404 and/or imaging device 1402. Thus, processors (or processor circuitry) 1434 may be communicatively coupled to both the image devices 1402 and the logic modules 1404 for operating those components. By one approach, although image processing system 1400, as shown in FIG. 14, may include one particular set of unit or actions associated with particular components or modules, these units or actions may be associated with different components or modules than the particular component or module illustrated here.

Figure 15:
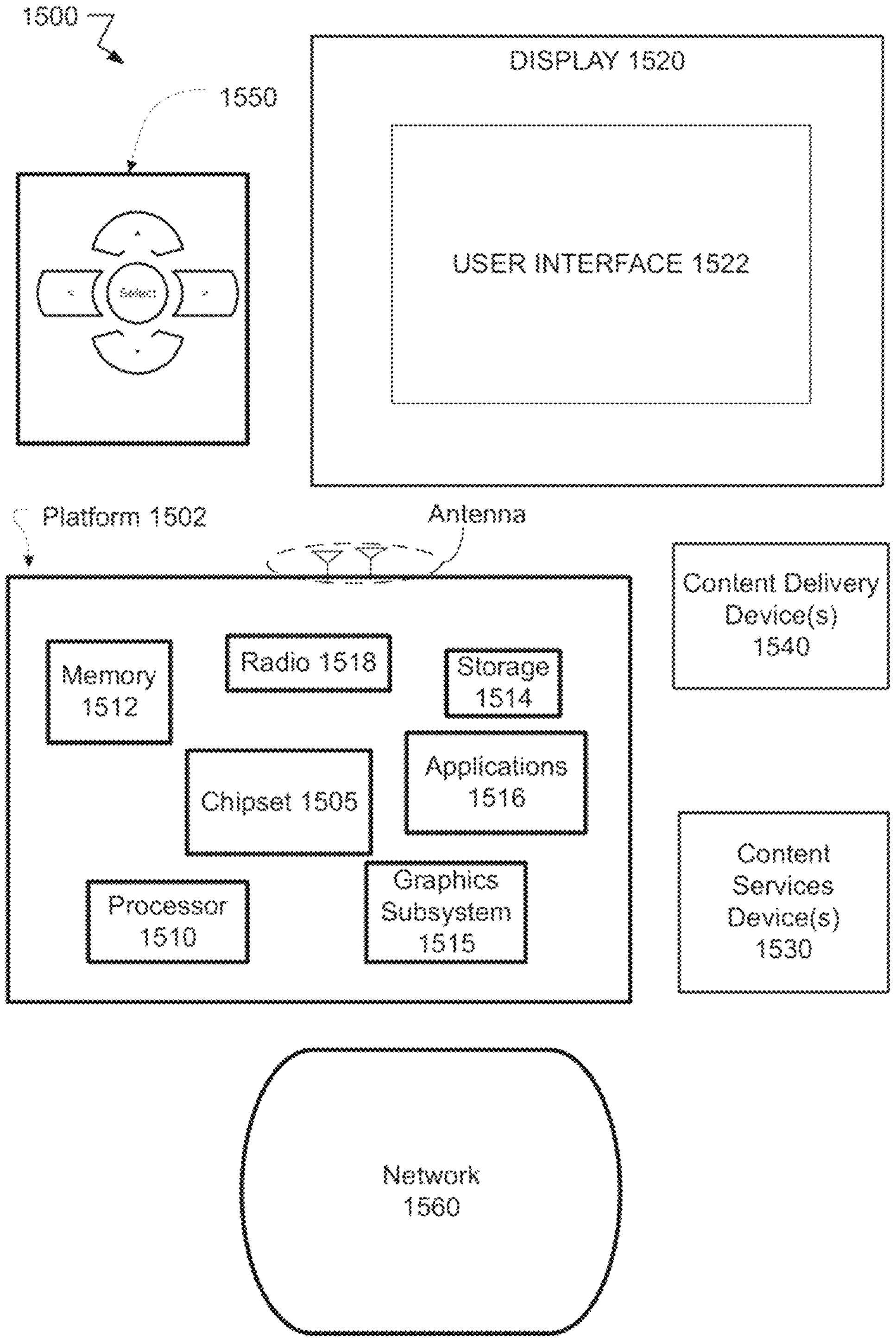
FIG. 15 is an illustrative diagram of another example system.

Referring to FIG. 15, an example system 1500 in accordance with the present disclosure operates one or more aspects of the image processing system described herein. It will be understood from the nature of the system components described below that such components may be associated with, or used to operate, certain part or parts of the image processing systems described above including performance of a camera system operation described above. In various implementations, system 1500 may be a media system although system 1500 is not limited to this context. For example, system 1500 may be incorporated into a digital video camera, or one or more cameras of a camera array, mobile device with camera or video functions such as an imaging phone, webcam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as processor circuitry with a Complex Instruction Set Computer (CISC) or Reduced Instruction Set Computer (RISC) processors; x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example, and may or may not include an image signal processor (ISP). An analog or digital interface may be used to communicatively couple graphics subsystem 1515 and display 1520. For example, the interface may be any of a High-Definition Multimedia Interface, Display Port, wireless HDMI, and/or wireless HD compliant techniques. Graphics subsystem 1515 may be integrated into processor 1510 or chipset 1505. In some implementations, graphics subsystem 1515 may be a stand-alone card communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of unidirectionally or bidirectionally communicating content between content providers and platform 1502 and/display 1520, via network 1560 or directly. It will be appreciated that the content may be communicated unidirectionally and/or bidirectionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In implementations, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In implementations, controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various implementations, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various implementations, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 15.

Figure 16:
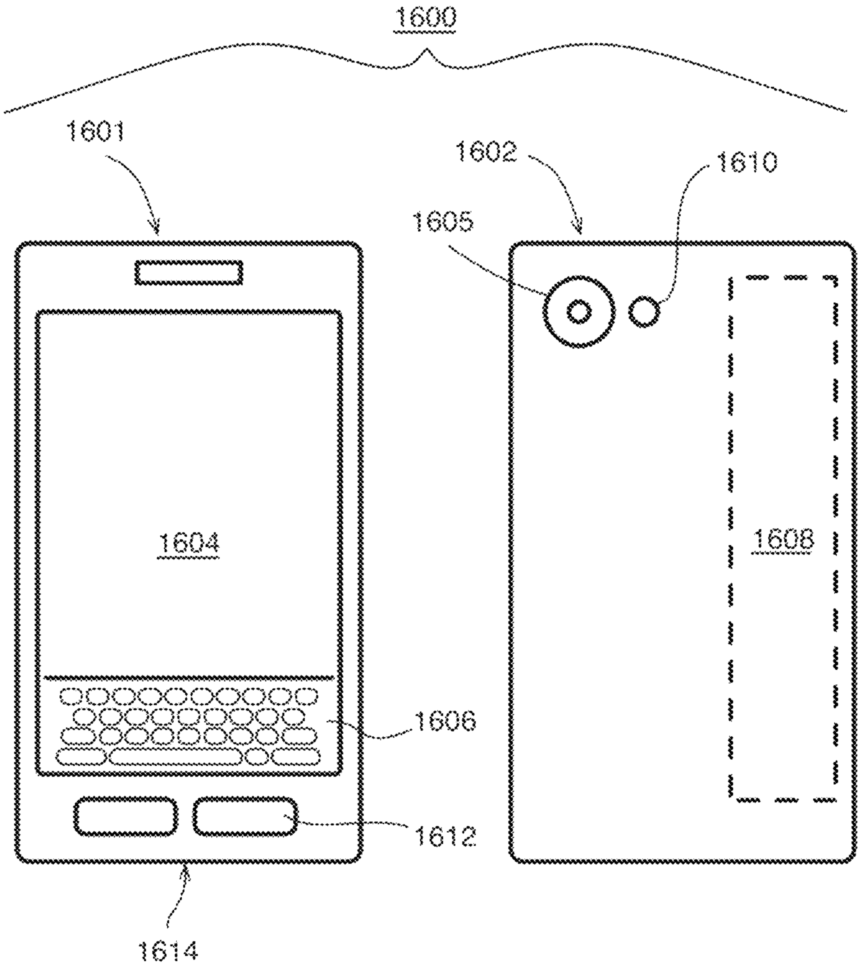
FIG. 16 illustrates another example device, all arranged in accordance with at least some implementations of the present disclosure.

Referring to FIG. 16, a small form factor device 1600 is one example of the varying physical styles or form factors in which systems 1400 or 1500 may be embodied. By this approach, device 1400 may be implemented as a mobile computing device 1600 having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 16, device 1600 may include a housing with a front 1601 and a back 1602. Device 1600 includes a display 1604, an input/output (I/O) device 1606, and an integrated antenna 1608. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone 1614, or may be digitized by a voice recognition device. As shown, device 1600 may include a camera 1605 (e.g., including at least one lens, aperture, and imaging sensor) and a flash 1610 integrated into back 1602 (or elsewhere) of device 1600. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor (or processor circuitry), which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By at least one first example implementation, a computer-implemented method of image processing comprises obtaining a plurality of video sequences of a same scene with at least one being; and generating at least one 3D skeleton with a plurality of joints and of one or more of the beings, the generating comprising obtaining joint clusters of candidate 3D points formed by using images of the video sequences, wherein each joint cluster is of a different joint on a single skeleton, and determining whether a joint confidence value indicating distances between pairs of the candidate 3D points of two of the clusters passes at least one criterion, wherein the at least one criterion is at least partly based on data from a pre-formed joint distance dataset developed by measuring joint distances of the beings.

By one or more second example implementation, and further to the first implementation, wherein the dataset is formed by using images of at least thousands of people.

By one or more third example implementations, and further to the first or second implementation, wherein the data comprises at least one of average distances, maximum distances, and minimum distances between joints on a skeleton associated with the dataset.

By one or more fourth example implementations, and further to any of the first to third implementation, wherein the generating comprises performing skeleton fitting to determine a single joint point of each joint cluster.

By one or more fifth example implementations, and further to any of the first to fourth implementation, wherein the determining comprises generating a joint confidence value of an individual candidate 3D point in one cluster that indicates how many points in another cluster are a distance from the individual candidate 3D point that passes one criterion, and keeping the individual candidate 3D point in the cluster when the joint confidence value passes at least another criterion.

By one or more sixth example implementations, and further to the fifth implementation, wherein the one criterion is whether the distance is within a range of distances established by the dataset.

By one or more seventh example implementations, and further to the fifth or sixth implementation, wherein the another criterion is a minimum proportion of the points in the other cluster that has a distance that passes the one criterion.

By one or more eighth example implementations, and further to any of the fifth to seventh implementation, wherein the method comprises comprising keeping at least one candidate 3D point with a maximum joint confidence value among candidate 3D points in a cluster when no candidate 3D point in the cluster has a confidence value that satisfies the another criterion.

By one or more ninth example implementations, and further to any of the first to eighth implementation, wherein the determining comprises keeping one or more candidate 3D points in a cluster of one joint when a candidate 3D point in the cluster of the one joint has a distance that passes the criterion when extending to an already established single joint point of another joint.

By one or more tenth example implementations, and further to any of the first to ninth implementation, wherein the determining comprises determining a single joint point of a cluster of candidate 3D points comprising using a mean-shift algorithm.

By one or more eleventh example implementations, and further to any of the first to tenth implementation, wherein the method comprises refining locations of single joint points each at an individual joint of the skeleton comprising using the data.

By one or more twelfth example implementations, a computer-implemented system comprises memory to store a plurality of video sequences of images of a plurality of perspectives of a same scene with at least one person; and processor circuitry communicatively coupled to the memory and being arranged to operate by: generating a 3D skeleton with a plurality of joints and of one or more individual people, the generating comprising generating 3D skeletons with a single joint point at each joint of the skeleton comprising using the images, refining one or more distances from one or more initial first joint locations to at least one other joint location of the same skeleton, wherein the refining comprises comparing the distances between the joint locations of the skeleton to a criterion at least partly based on one or more pre-formed datasets of measured skeletons of people, and modifying one or more of the joint locations that have at least one distance between the joints that do not pass the criterion.

By one or more thirteenth example implementations, and further to the twelfth implementation, wherein the criterion is whether the at least one distance meets or fits within a predetermined range of acceptable joint to joint distances based on the pre-formed dataset.

By one or more fourteenth example implementations, and further to any one of the twelfth to thirteenth implementation, wherein the dataset has data for multiple different joint connections on the skeleton.

By one or more fifteenth example implementations, and further to any one of the twelfth to fourteenth implementation, wherein the dataset is associated with data that establishes at least a mean distance, a maximum distance, and a minimum distance of each different joint pair connection available for skeleton reconstruction.

By one or more sixteenth example implementations, and further to any of the twelfth to fifteenth implementation, wherein the modifying comprises using a mean distance at least partly based on the dataset and to replace a joint to joint distance of the skeleton.

By one or more seventeenth example implementations, and further to any of the twelfth to sixteenth implementation, wherein the refining comprises incrementing a joint error indicator each time a connection to a joint does not meet the criterion.

By one or more eighteenth example implementations, at least one non-transitory machine-readable medium comprises instructions that in response to being executed on a computing device, cause the computing device to operate by: obtaining a plurality of video sequences of images of a plurality of perspectives of a same scene with people; and generating at least one 3D skeleton with a plurality of joints and of one or more individual people in the scene comprising: obtaining joint clusters of candidate 3D points formed by using the images, wherein each joint cluster is of a different joint on a single skeleton, determining whether distances between pairs of candidate 3D points of two clusters of the single skeleton passes at least a first criterion, wherein the first criterion is at least partly based on data from a pre-formed joint distance dataset developed by measuring joint distances of people, generating a single joint point of individual clusters comprising using candidate 3D points that satisfy the first criterion, and refining the locations of the single joint points of the skeleton using a second criterion at least partly based on the data.

By one or more nineteenth example implementations, and further to the eighteenth implementation, wherein the data of the first and second criterion is an acceptable range of distances between joints established by using the dataset.

By one or more twentieth example implementations, and further to the eighteenth or nineteenth implementation, wherein the determining comprises incrementing a joint confidence value of a candidate 3D point of a first cluster upward each time a point of a second cluster has a distance to the candidate 3D point that satisfies the first criterion, wherein each increment is a fraction of one over the number of points in the second cluster so that a total confidence value of the candidate 3D point of the first cluster is a proportion of the points on the second cluster that satisfies the first criterion.

By one or more twenty-first example implementations, and further to the twentieth implementation, wherein a total confidence value is determined for each candidate 3D point in the first cluster to determine whether or not to keep the candidate 3D point in the first cluster.

By one or more twenty-second implementations, and further to any of the eighteenth to twenty-first implementations, wherein the refining comprises determining a joint point location error by using a range of distances from the data and replacing a distance between joints with at least one joint point location error by using a mean distance from the data.

By one or more twenty-third implementations, and further to any of the eighteenth to twenty-second implementations, wherein forming the candidate 3D points from the images comprises removing an outlier pairing of 2D points of the same joint when 2D pose confidence values of at least one of the 2D points do not pass a third criterion.

In one or more twenty-fourth example implementations, a device or system includes a memory and processor circuitry to perform a method according to any one of the above implementations.

In one or more twenty-fifth example implementations, at least one machine readable medium includes a plurality of instructions that in response to being executed on a computing device, cause the computing device to perform a method according to any one of the above implementations.

In one or more twenty-sixth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented system comprising:

memory to store a plurality of sequences of images of a plurality of perspectives of a same scene;

instructions; and at least one processor circuit to be programmed based on the instructions to:

generate a three-dimensional (3D) skeleton with joint points at respective joint locations of the skeleton based on the images;

increment a joint error indicator based on a connection to at least one of the joint points not meeting a criterion, the criterion based on one or more datasets of measured skeletons of people;

refine one or more distances from one or more of the joint locations to at least one other of the joint locations of the skeleton based on the joint error indicator and comparison of the one or more distances to information in the one or more datasets of measured skeletons of people; and modify, based on the refined one or more distances, one or more of the joint locations associated with at least one connection that does not pass the criterion.

2. The system of claim 1, wherein the criterion is associated with a range of acceptable joint-to-joint distances based on the one or more datasets.

3. The system of claim 1, wherein the one or more datasets include data for multiple different joint connections on the skeleton.

4. The system of claim 1, wherein the one or more datasets include at least one of mean distances of different joint pair connections, maximum distances of different joint pair connections, or minimum distances of different joint pair connections.

5. The system of claim 1, wherein one or more of the at least one processor circuit is to replace at least one of the one or more distances of the skeleton based on a mean distance, the mean distance based on the one or more datasets.

6. At least one non-transitory machine-readable medium comprising instructions to cause at least one processor circuit to at least:

determine joint clusters of candidate three-dimensional (3D) points based on images of a plurality of perspectives of a scene, the joint clusters corresponding to respective different joints on a 3D skeleton of a person in the scene;

determine whether distances between pairs of candidate 3D points of two clusters of the skeleton satisfy a first criterion, the first criterion based on measured joint distances of people, the two clusters including a first cluster and a second cluster;

increment a joint confidence value of a first candidate 3D point of the first cluster based on a point of the second cluster having a distance to the first candidate 3D point that satisfies the first criterion, the increment being a fraction of one over a number of points in the second cluster, wherein a total confidence value of the first candidate 3D point of the first cluster is to represent a proportion of the points of the second cluster that satisfy the first criterion;

generate joint points of the skeleton based on the candidate 3D points that satisfy the first criterion; and refine locations of the joint points of the skeleton based on a second criterion.

7. The medium of claim 6, wherein the first criterion and the second criterion are based on an acceptable range of distances between joints established based on a dataset.

8. A method comprising:

obtaining joint clusters of candidate three-dimensional (3D) points based on images of video sequences of a same scene, the joint clusters corresponding respectively to different joints on a 3D skeleton;

determining whether a first joint confidence value representative of distances between pairs of the candidate 3D points of two of the joint clusters passes at least one criterion, the at least one criterion based on a dataset, the dataset based on measured joint distances of human beings;

generating a second joint confidence value for an individual candidate 3D point in a first joint cluster of the joint clusters, the second joint confidence value to indicate how many points in a second joint cluster of the joint clusters are a distance from the individual candidate 3D point that passes the at least one criterion; and keeping the individual candidate 3D point in the first joint cluster based on the second joint confidence value passing at least another criterion.

9. The method of claim 8, wherein the dataset is based on images of at least a thousand people.

10. The method of claim 8, wherein the dataset includes at least one of average distances between skeleton joints, maximum distances between skeleton joints, or minimum distances between skeleton joints.

11. The method of claim 8, further including performing skeleton fitting to determine joint points corresponding respectively to the joint clusters.

12. The method of claim 8, wherein the at least one criterion is whether the distance is within a range of distances established by the dataset.

13. The method of claim 8, wherein the at least another criterion is a minimum proportion of the points in the second joint cluster that have a distance that passes the at least one criterion.

14. The method of claim 8, including keeping at least one candidate 3D point with a maximum joint confidence value among candidate 3D points in the first cluster based on no candidate 3D point in the first cluster satisfying the at least another criterion.

15. The method of claim 8, wherein the determining includes keeping a candidate 3D point in a third joint cluster associated with a first joint based on the candidate 3D point in the third joint cluster having a distance to an established joint point that passes the at least one criterion.

16. The method of claim 8, wherein the determining includes determining a single joint point of the first cluster based on a mean-shift algorithm.

17. The method of claim 8, including refining locations of joint points at respective individual joints of the skeleton based on the dataset.

* * * * *